US012493790B2

(12) United States Patent
Nair et al.

(10) Patent No.: US 12,493,790 B2
(45) Date of Patent: Dec. 9, 2025

(54) GENERATING VARIABLE COMMUNICATION CHANNEL RESPONSES USING MACHINE LEARNING NETWORKS

(71) Applicant: DeepSig Inc., Arlington, VA (US)

(72) Inventors: Nitin Nair, Arlington, VA (US); Raj Bhattacharjea, Atlanta, GA (US); Tamoghna Roy, Arlington, VA (US); Timothy James O'Shea, Arlington, VA (US); Nathan West, Washington, DC (US)

(73) Assignee: DeepSig Inc., Arlington, VA (US)

( * ) Notice: Subject to any disclaimer, the term of this patent is extended or adjusted under 35 U.S.C. 154(b) by 763 days.

(21) Appl. No.: 17/827,250

(22) Filed: May 27, 2022

(65) Prior Publication Data

US 2022/0383118 A1    Dec. 1, 2022

Related U.S. Application Data

(60) Provisional application No. 63/194,744, filed on May 28, 2021.

(51) Int. Cl.
*H04B 17/391*     (2015.01)
*G06N 3/08*       (2023.01)

(52) U.S. Cl.
CPC ......... *G06N 3/08* (2013.01); *H04B 17/3912* (2015.01)

(58) Field of Classification Search
CPC ..... G06N 3/08; H04B 17/391; H04B 17/3912
See application file for complete search history.

(56) References Cited

U.S. PATENT DOCUMENTS

| | | | |
|---|---|---|---|
| 2019/0147713 A1 | 5/2019 | Devison et al. | |
| 2019/0274108 A1* | 9/2019 | O'Shea | H04B 17/3912 |
| 2020/0145951 A1 | 5/2020 | O'Shea et al. | |
| 2021/0319894 A1* | 10/2021 | Sobol | G16H 20/30 |

FOREIGN PATENT DOCUMENTS

CA    2977300    2/2019

OTHER PUBLICATIONS

International Preliminary Report on Patentability in International Appln. No. PCT/US2022/31387, mailed on Dec. 7, 2023, 6 pages.
Extended European Search Report in European Appln. No. 22812282.6, dated Aug. 22, 2024, 9 pages.
International Search Report and Written Opinion in International Appln. No. PCT/US2022/31387, mailed on Aug. 19, 2022, 7 pages.

* cited by examiner

*Primary Examiner* — Tuan H Nguyen
(74) *Attorney, Agent, or Firm* — Fish & Richardson P.C.

(57) ABSTRACT

Methods, systems, and apparatus, including computer programs encoded on computer-storage media, for providing one or more values from a distribution of values to a neural network trained to generate simulated channel responses corresponding to one or more radio frequency (RF) communication channels; and obtaining an output of the neural network based on processing the one or more values by the neural network, the output indicating a simulated channel response corresponding to at least one communication channel of the one or more RF communication channels.

20 Claims, 12 Drawing Sheets

GENERATING VARIABLE COMMUNICATION CHANNEL RESPONSES USING MACHINE LEARNING NETWORKS

CROSS-REFERENCE TO RELATED APPLICATIONS

This application claims the benefit of priority of U.S. Provisional Application No. 63/194,744, filed May 28, 2021, the contents of which are incorporated here by reference in their entirety.

FIELD

This specification generally relates to communication system that use machine learning and includes processing of communication signals using a machine-learning network.

BACKGROUND

Communication systems involve transmitting and receiving various types of communication media, e.g., over the air, through fiber optic cables or metallic cables, under water, or through outer space. In some cases, communication channels use radio frequency (RF) waveforms to transmit information, in which the information is modulated onto one or more carrier waveforms operating at RF frequencies. In other cases, RF waveforms are themselves information, such as outputs of sensors or probes. Information that is carried in RF waveforms is typically processed, stored, and/or transported through communication channels or other forms of communication, such as through an internal system bus in a computer or through local or wide-area networks.

SUMMARY

In some implementations, the subject matter described in this disclosure can be embodied in methods, apparatuses, and systems for jointly or iteratively training neural networks to process communication signals. Neural networks can include one or more neural networks that are configured to encode communication signals to be sent through a communication channel, one or more neural networks that are configured to decode an encoded signal that is transmitted and received over the channel, and one or more neural networks that are configured to simulate or approximate the effects of a real-world communication channel (e.g., effects such as fading or interference caused by dense urban multipath environments, harsh or crowded indoor environments, dynamic mobile or high speed environments, high delay spread or high doppler environments, or other forms of interference and/or distortion filled channel environments, among others) on communication signals propagated through the channel. One or more neural networks simulating or approximating the effects of a real-world communication channel can be trained using a variational autoencoder to generate variable channel responses. A channel response can include complex or real values of power received at different delays for one or more antennas. The power received at different delays can be due to a transmitted signal being reflected, refracted, scattered, or absorbed by various features of the environment of the communication channel. A change in the environment, such as a car moving across the path of the signal propagation or a change in weather, among others, can change the power received by a receiver at different delays.

Traditional models to simulate or approximate communication channels are static models. Some include tuning parameters to account for the type of environment, e.g., rural, urban, suburban, among others. However, such static models do not account for natural variations in the environment and do not reflect the actual conditions of a particular environment, but instead usually reflect average conditions across similar environments. The result is that communications tuned and analyzed using such models are not always accurate and may require additional fine tuning by a user. In contrast, the subject matter described herein provides for generating a channel response based on information of actual signals transmitted in a particular environment (e.g., either the particular environment or an environment that shares a threshold number of features with the particular environment or other stored environments). Furthermore, the channel response can be varied over time to approximate real world variations of signal propagation due to variations in the communication environment (e.g., movement of objects, cars, time of day, or change in weather, among others).

Communication systems have been traditionally constructed by manually defining and implementing modulation and coding algorithms based on analytic models derived with convenient algebraic expressions (e.g., for the channel effects, for the structure of the modulation and/or coding process, and/or other effects of the transceivers). In contrast to such hand-crafted engineering artifacts, the techniques disclosed herein use encoding and decoding networks that rely on large-scale learning processes and data (e.g., from measurement) to transform or encode messages of first information into near-optimal transmit waveforms and decode received waveforms back into second information messages, which can be increasingly efficient and near optimal. For example, in some implementations, to optimize such encoding and decoding networks, a gradient of a loss or distance function between the first and second information is used for backpropagation of parameters in a machine-learning network.

To compute this gradient between the encoder and the decoder, a model for impairments that occur to the radio signal based on analog hardware components and/or radio propagation effects (e.g., the communication channel model) is included so that its gradient may also be computed. This disclosure describes methods and systems that treat the training of this channel model, and of the learned encoding and decoding systems, as two learning problems which can be optimized as one or more problems, or iteratively by alternating between the two problems. In some cases, learning includes optimization using a machine learning method such as stochastic gradient descent. In some implementations, a process of optimizing two competing objective functions or loss functions is performed by an adversarial network.

By using a parametric network for function approximation and a wide variety of linear, non-linear, and difficult-to-model channel impairment effects, a communication channel is approximated and modeled rapidly by the disclosed techniques without compromising the validity of the channel model by attempting to simplify it. By jointly optimizing the objectives of channel approximation and near-optimal information encoding for the approximated channel, communication systems can be designed for specific hardware devices, communication systems, channel types or impairments, or other constraints, which are traditionally hard to model or result in sub-optimal performance (for example, when making simplifying assumptions about the channel effects).

Communication system design has traditionally been treated as a manual analytic problem decomposed into a plurality of specific tasks, such as placing maximally separated constellation points on an equally spaced rectangular grid with simple analytic slicing functions or designing code words that employ rate-changing polynomials and introduce parity or information mixing that can be probabilistically recovered through a customized decoding algorithm. However, as described below, the disclosed techniques treat a communication system as a large optimization problem, in which networks of encoders and decoders with high degrees of freedom are able to arbitrarily mix information and learn near-optimal encoding representations, driven principally by a high-level loss function (e.g., symbol error rate or bit error rate). In doing so, the disclosed techniques allow for a new class of highly efficient communication system designs, which can outperform traditional solutions to many radio communications and encoding problems. In this context, near-optimal is meant to indicate nearly as good as achievable in terms of performance metrics such as capacity, throughput, or power, given the limitations of physics and information theory for the set of wireless system and operating environment constraints.

Conventional systems that relied on manually defined processes for encoding and decoding of first information to obtain second information typically used certain assumptions about the channel models for which they were optimizing. For example, a traditional modulation method (e.g., QPSK, 64-QAM, OFDM, or similar) or coding method (e.g., convolutional codes, BCH codes, turbo codes, LDPC codes, or similar), was modeled relative to a known channel model. In many cases, the channel models used are simplified to make analysis of the model under study (i.e., the modulation or coding method) easier to derive, prove, and demonstrate. For example, a common assumption is that a channel has simple Additive White Gaussian Noise (AWGN), rather than more realistic radio frequency (RF) noise. While analytic channel models exist and are used for common channel effects (e.g., multipath fading, carrier offset and Doppler modeling), some are poor approximations of real-world effects. In many cases, channel measurement in specific deployment environments is used to understand and approximate how to derive a parameterized and closed-form channel model. These measurements can be difficult or expensive to conduct and is often limited to modeling a few of the parameters, thus underrepresenting the full effect of the real-world channel. Similarly, in existing learned encoding and decoding systems, a differentiable model for the channel effects represented in some closed analytic form is often used to perform optimization, relying on a compact closed form expression for each effect present in the channel.

In contrast to the above, the techniques disclosed herein rely on optimization and observation of a channel model directly on real world channel measurements, and a high degree-of-freedom non-linear network model to approximate the channel. This approach removes the need for a closed form channel model or assumptions about the channel effects present in the system. In some cases, the channel is approximated iteratively or concurrently with the encoding optimization process to learn representations and encodings that are near optimal across a wide range of non-linear and/or hard-to-model channel impairment sources in wireless or analog components, such as amplifiers.

One innovative aspect of the subject matter described in this specification is embodied in a method that includes obtaining one or more values indicating a channel response of a communication channel, where one or more values indicating the channel response is represented by a first data structure with N degrees of freedom; providing the one or more values to a first machine learning model trained to generate parameters for a second data structure that is represented with less than N degrees of freedom; obtaining a first output from the first machine learning model, the first output including one or more parameters; generating the second data structure using the one or more parameters; and providing the second data structure to a second machine learning model trained to generate a synthetic channel response.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, In some implementations, generating the second data structure using the one or more parameters includes determining a stochastic distribution using the one or more parameters; and obtaining a value of the second data structure using the stochastic distribution.

In some implementations, actions include comparing the stochastic distribution with a training distribution for training the first machine learning model; and updating the first machine learning model based on comparing the stochastic distribution with the training distribution.

In some implementations, the training distribution is one of a Gaussian distribution, tapped delay line (TDL), cluster delay line (CDL), Rician distribution, Rayleigh distribution, or results from a simulated ray-tracing model or other spatial simulation model.

In some implementations, actions include comparing the synthetic channel response with one or more obtained channel responses; and adjusting parameters of the second machine learning model based on comparing the synthetic channel response with the one or more obtained channel responses.

In some implementations, actions include sending first information through the communication channel; obtaining, as an output of the communication channel, second information as a representation of the first information having been altered by transmission through the communication channel; and generating the one or more values indicating the channel response based on comparing the first information to the second information.

In some implementations, the communication channel includes at least one of an Additive White Gaussian Noise (AWGN) or Rayleigh fading channel model, International Telecommunication Union (ITU) or 3rd Generation Partnership Project (3GPP) fading channel model, emulated radio emissions, propagation models, ray tracing within simulated geometry or an environment to produce channel effects, TDL, CDL, a machine-learning network trained to approximate measurements over a real channel, channel state information estimation routine or other measurement signal processing algorithm, a combination of simulation and hardware transmission components, or a channel measurement within a wireless system.

In some implementations, actions include generating a received signal using the synthetic channel response and information corresponding to the received signal.

In some implementations, generating the received signal includes generating an output corresponding to a combination of the synthetic channel response and the information as the received signal.

In some implementations, the combination includes a result of a multiplication between data represented by the synthetic channel response and data represented by the information.

In some implementations, the combination includes a result of a convolution between data represented by the synthetic channel response and data represented by the information.

Another innovative aspect of the subject matter described in this specification is embodied in a method that includes obtaining one or more values from a distribution of values; providing the one or more values to a neural network trained to generate simulated channel responses corresponding to one or more radio frequency (RF) communication channels; and obtaining an output of the neural network based on processing the one or more values by the neural network, the output indicating a simulated channel response corresponding to at least one communication channel of the one or more RF communication channels.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, In some implementations, the distribution of values is generated by an encoder neural network.

In some implementations, actions include training the encoder neural network using one or more real world channel responses.

In some implementations, actions include training the encoder neural network using data transmitted through a communication channel and the data received after being transmitted through the communication channel as one or more transmit and receive data pairs.

In some implementations, providing training output using the simulated channel response, where the training output is used to train one or more of a wireless receiver, a channel estimator, a signal encoder network, a signal decoder network, or a multiple inputs and multiple outputs (MIMO) system.

In some implementations, the training output includes an approximation of a received signal.

In some implementations, the distribution of values is generated using data captured from a radio unit (RU) or distributed unit (DU).

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
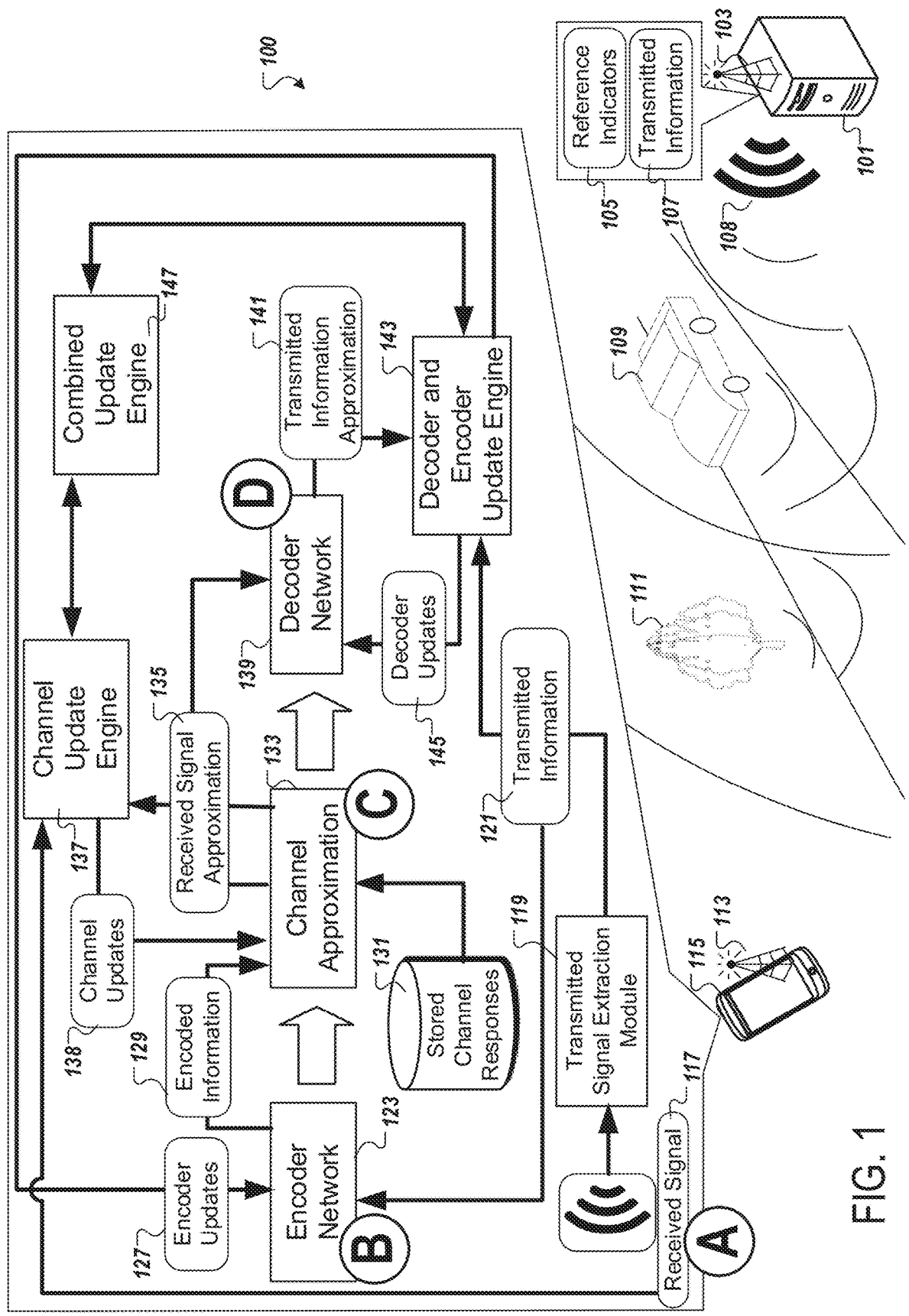
FIG. 1 is a diagram showing an example of a system for training one or more networks based on obtained channel responses.

FIG. 1 is a diagram showing an example of a system 100 for training one or more networks based on obtained channel responses. The one or more networks include a signal encoder network 123, a signal decoder network 139, and a channel approximation module 133. The channel approximation module 133 can include one or more networks. Networks, as referred to herein, can include neural networks, such as deep neural networks, convolutional neural networks, among others, and other machine learning based algorithms. In this context, a channel response can represent a frequency response for a communication channel and can include complex or real values of power received at different delays from one or more antennas.

The system 100 includes the device 115 (e.g., a user device, smartphone, laptop, among others) and the device 101 (e.g., a user device, smartphone, server, laptop, among others) and corresponding modules and processes operated by the devices. The one or more networks shown in FIG. 1 can be operated by the device 115, or another electronic device communicably connected to the device 115. For example, the device 115 can include memory storing instructions configured to be executed by one or more processors of the device 115 to perform operations of the one or more networks. Additionally, or alternatively, in some cases, the device 115 can be communicably connected to another device, such as a server computer. In such cases, the server performs operations corresponding to the functionalities of the one or more networks. For example, the device 115 can provide and access data from the server. The server can receive data from the device 115 and provide output based on performing one or more operations of the one or more networks. The server can include memory storing instructions configured to be executed by one or more processors of the server to perform operations of the one or more networks.

FIG. 1 shows transmission of a wireless communication signal 108 from the device 101 to the device 115. The signal 108 can be, for example, a cellular signal, a Wi-Fi signal, or some other type of wireless signal. The signal 108 propagates through a wireless communication channel in an environment, which can be, e.g., an outdoor open space, indoor enclosed space, or a combination of indoor and outdoor spaces. The environment can exhibit non-linear (e.g., power amplifiers), linear, or a combination of non-linear and linear impairment effects, which includes environmental elements that affect characteristics of the signal as it is propagated through the wireless communication channel from the transmitter (e.g., device 101) to the receiver (e.g., device 115). For example, FIG. 1 shows visual representations of approximate propagation effects on the signal 108 from environmental elements including obstacles such as a tree 111 and a vehicle 109. Environmental elements can also include buildings, animals, people, physical geography (e.g., topography), among others. The signal 108 transmitted from the device 101 is received by the device 115 and processed as received signal 117. In addition, environmental elements that can affect signal propagation include weather, time of day, and other nearby wireless device activity.

An environment can include at least one transmitter and receiver in a fixed or mobile environment, in which devices may move around, with different GPS locations, positions, pointing angles, antenna patterns, elevations, or other properties or nearby activities or events in the vicinity, and wherein devices in a real-world version of the scenario can be used to capture data measurements, sounding data, and logged parameters and train a channel model, where the trained model may be used to train a simulated version of the scenario.

An environment can include one or more radio emitters transmitting data. The radio emitters can include, for example, a number of different cellular towers, cellular antennas or elements, Wi-Fi emitters, or another form of wireless signal or Radio frequency emitter such as broadcast tower, a communications system, or emissions from a vehicle, among others. A radio receiver device, such as the device 115 and corresponding antenna 113, can receive these transmissions and is able to capture and record a number of properties about the radio signal emissions. The properties may include the exact transmitted values "x" (for example, if the transmitted values are known a-priori, from a correctly received packet, or from some other means), the actual received values/samples "y", as well as estimates of the channel response in the form of an estimated channel response "h".

The properties may be combined with metadata about the transmitter or receiver, which can include a wide range of information. The receiver device may be following some spatial path through the environment, wherein the receiver may record one or more values such as altitude, latitude, longitude, or relative location on a more local frame of reference, as well as azimuth and elevation of the antenna pointing angle, properties about the transmit or receive antenna, environmental factors such as the temperature, humidity, surrounding area or geometry of the surrounding area, among others. Many of these additional sounding variables may be impactful in the resulting channel response "h" or the direct relationship between channel input "x" and the channel output "y". Accordingly, the process of capturing and recording these values during the sounding or channel measurement campaign herein may be important.

A version of the signal 108 is received at the device 115 as received signal 117, after propagation through the wireless communication channel. Because of imperfections in antennas used to send or receive the signal 108, e.g., antenna 103 of the device 101 or antenna 113 of the device 115, or effects of environmental elements during propagation, such as the vehicle 109 and/or the tree 111, the received signal 117 may not be identical to the transmitted signal 108. For example, the signal 108 may be reflected off the vehicle 109 and as the vehicle 109 moves, the reflection of the signal 108 changes, causing changes in signal propagation and resulting in a change in the signal received by the device 115.

In some implementations, the device 101 generates the signal 108 using reference indicators 105. The reference indicators 105 can include specific characters or symbols. As shown, the transmitted signal 108 is used to convey transmitted information 107, e.g., transmitted information 107 corresponds to data that is modulated into a radio frequency (RF) signal waveform as signal 108. The device 101 can include one or more digital to analog converters to convert the transmitted information 107 to analog signal 108. One or more antennas of the device 101 transmit the signal 108 over the wireless communication channel.

The device 115 processes the signal 117 that it receives; this processing and related training is described with respect to stages A-D in FIG. 1. As shown, in stage A, the device 115 receives, using one or more antennas 113, signal 117 as a representation of the signal 108. The transmitted signal extraction module 119 of the device 115 obtains the received signal 117. In some cases, the signal 117 is a digital representation of a received analog signal. One or more analog to digital converters or preprocessing techniques in the device 115 are used to convert the analog signal received by the device 115 to the received signal 117.

The transmitted signal extraction module 119 extracts, from the received signal 117, transmitted information 121, as a representation of the transmitted information 107 encoded in the signal 108 by the device 101. The transmitted information 121 and the transmitted information 107 can be in the form of symbols, bits, code words, or other suitable information.

In some implementations, along with the transmitted information 107, the device 101 includes the reference indicators 105 in the transmitted signal 108. In such cases, the transmitted signal extraction module 119 also identifies the reference indicators 105 in the received signal 117. In some cases, the reference indicators 105 can be a series of bits within a header or another part of the signal 108. The reference indicators 105 can be used at the receiver to determine what the transmitted information 121 is, and/or or how to generate the transmitted information 121 from the received signal. For example, the reference indicators 105 can include data to enable the device 115 to perform a checksum of the received signal such that the device 115 can determine if the transmitted information 121 is an accurate representation of the transmitted information 107.

Use of the reference indicators is useful in cases where timing reference is not shared between the device 101 and the device 115. In such cases, the reference indicators 105 can be used for reference synchronization, to enable the device 115 determine an arrival time of a reference signal, which may be a standalone signal or a portion of the signal 108. The device 115 can recover the transmitted information 107 through a process of aligned signal association (e.g., a time-aligned or frequency-aligned signal is extracted from the received digital signal 117 using reference synchronization information and can be associated with the transmitted information 107 from the modulation information source).

In some implementations, as an addition or an alternative to using bits, the device 101 inserts a reference tone within the signal 108 as reference indicators 105. For example, the device 101 can include the transmitted information 107 and a reference tone, such as a pseudorandom (PN) chip sequence, or other known preamble or reference tone within the signal 108. The reference tone can be inserted at some known time offset to the encoded information (e.g., immediately preceding it, succeeding it, or otherwise). The device 115 can determine the timing (and frequency) of the encoded and transmitted information 107 of the signal 108 by the known time offset.

In some implementations, the reference indicators 105 include a sequence number corresponding to a known protocol. The protocol associates different sequence numbers with different strings of data or other numbers that can be included in a transmitted message. The protocol can be known to both the device 101 and the device 115, and the sequence number associated with the reference indicators 105 for the signal 108 can be included in the signal 108 or can be known by both device 101 and device 115 before the transmission of the signal 108. The device 101 and the device 115 can access details of the protocol (e.g., stored within each device's memory or in one or more remote servers communicably connected to each device) to determine parts of the signal 108, such as control and data portions. The device 115 can generate the transmitted information 121 that matches the transmitted information 107 using data from the signal 108 and prior knowledge about sequence numbers associated with the known protocol.

In some implementations, in addition to the signal 117 received by the device 115, the transmitted information 107 is obtained by the device 115 through an out-of-band communication. For example, the device 115 can obtain the transmitted information 107 through a wired connection with the device 101, or through another mode of wireless communication that has been pre-calibrated between the device 101 and the device 115.

In stage B, the signal encoder network 123 encodes the transmitted information 121 to generate encoded information 129, which can be in analog or digital form depending on the configuration of the signal encoder network 123. Digital to analog conversion can be included in either the signal encoder network 123 or the channel approximation module 133. In some implementations, the signal encoder network 123 operates as, or supplements, the role of a traditional modulator, or modulator and encoder. The signal encoder network 123 can include one or more neural networks, or one or more layers of a neural network, to convert information to a RF signal form for transmission through a real or simulated channel. In some implementations, the encoded information 129 includes a RF signal waveform representation. For example, the encoder network 123 can generate a waveform representation of the transmitted information 121 as the encoded information 129. The waveform representation can include amplitude of a signal over time.

In the example of FIG. 1, the signal of encoded information 129 encoded by the encoder network 123 is sent through a channel approximation module 133, instead of an actual transmission. The channel approximation module 133 simulates the effects of a signal propagating through an environment, such as a wireless transmission channel. For example, the channel approximation module 133 can simulate the effects of the tree 111 and the vehicle 109 among other signal effects for the communication channel between the device 101 and the device 115. The channel approximation module 133 can also emulate the transfer function of one or more analog electronic radio components used to transmit or receive wireless signals.

In stage C, the channel approximation module 133 generates a received signal approximation 135 using the encoded information 129 and a channel response. The generation of a channel response in the channel approximation module 133 is discussed with respect to later figures, including FIG. 2 through FIG. 5B. The channel response used to generate the received signal approximation 135 is determined using the stored channel responses 131 as discussed in later figures. The channel response represents a frequency response for a communication channel and can include complex or real values of power received at different delays from one or more antennas.

In some implementations, the channel approximation module 133 is configured to emulate a transfer function of one or more analog electronic radio components or wireless transmission channels. In some implementations, the channel approximation module 133 includes a series of pre-processing or normalization steps. For example, the pre-processing can include detection, synchronization, normalization, filtering, or tuning, among others. In some cases, the pre-processing includes Digital Signal Processing (DSP) routines (e.g., software, firmware, gateware, digital logic, among others). In some cases, the pre-processing can include one or more additional neural network based pre-processing tasks.

In some implementations, the channel approximation module 133 performs one or more operations including a convolution, which operate on a signal prior to simulated transmission. For example, the channel approximation module 133 can convolve a channel response, such as a channel response from the stored channel responses 131 or a generated simulated channel response using the stored channel responses 131, with the encoded information 129. The output of the convolution between the channel response and the encoded information 129 can represent the received signal approximation 135.

In stage D, the signal decoder network 139 obtains the received signal approximation 135 from the channel approximation module 133. The decoder network 139 attempts to reproduce the transmitted information 121 using the received signal approximation 135. The received signal approximation 135 can be in analog or digital form depending on the configuration of the channel approximation module 133. Analog to digital conversion can be included in either the channel approximation module 133 or the decoder network 139. Similar to the signal encoder network 123, the signal decoder network 139 converts data from one form to another. Whereas the signal encoder network 123 converts information to be transmitted to a signal of encoded information to be transmitted, the signal decoder network 139 converts a received signal to an approximation of the information transmitted in the encoded information 129, referred to here as a transmitted information approximation 141.

In some implementations, the signal encoder network 123 and the signal decoder network 139 are trained to learn a physical layer modulation scheme using real radio transmission data, such as the signal 108 sent from the device 101 to the device 115. Using the trained signal encoder network 123 and the signal decoder network 139, the device 115 can optimize encodings and channel approximations for a radio communication system.

In some implementations, the device 115 or a device communicably connected to the device 115, optimizes one or more neural networks included in the signal encoder network 123, the signal decoder network 139, and the channel approximation module 133. Optimization can include using one or more adversarial techniques. The networks can be iteratively or jointly trained to learn near-optimal representations of radio information encodings, e.g., for non-linear wireless channels and electronic device responses. In some cases, the system 100 can provide effective information encodings and channel approximation functions (e.g., encodings that maximize or minimize some objective such as throughput, bit error rate, or frame error rate) for cases that are considered difficult (e.g., the transfer function of the component or wireless effect is hard to model or compensate for accurately or at low computational complexity in traditional systems, leading to performance degradation). Optimization can refer to a process of updating weights within each network in an iterative process such as stochastic gradient descent or through other means. Two or more processes can run jointly or iteratively to optimize the signal encoder network 123, the signal decoder network 139, and the channel approximation module 133.

In some implementations, the signal decoder network 139 includes one or more pre-processing or normalization operations. For example, the pre-processing can include detection, synchronization, normalization, filtering, or tuning, among others. In some cases, the pre-processing includes DSP routines (e.g., software, firmware, gateware, digital logic, among others). In some cases, the pre-processing can include one or more additional neural network based pre-processing tasks.

Updates to the encoder network 123 or the decoder network 139, or both, are performed by decoder and encoder update engine 143, while updates to the channel approximation module 133 is performed by the channel update engine 137. The decoder and encoder update engine 143 and the channel update engine 137 perform one or more updates either iteratively or jointly based on the received signal 117 or the signal 108, or both. In some implementations, the update engines use loss functions for the channel approximation module 133, the signal encoder network 123 and the signal decoder network 139, to optimize the communication channel modeling or approximation, and the auto-encoding done by the encoder network 123 and the signal decoder network 139. For example, the decoder and encoder update engine 143 can generate a loss function that indicates the difference between the transmitted information approximation 141 and the transmitted information 121. Over multiple iterations of training, a loss value corresponding to the output of the loss function can be reduced, such that the transmitted information approximation 141 more closely matches the transmitted information 121 over time.

Similarly, the channel update engine 137 can generate a loss function that indicates the difference between the received signal approximation 135 and the received signal 117. Over multiple iterations of training, a loss value corresponding to the output of this loss function can be reduced such that the received signal approximation 135 more closely matches the received signal 117 over time. The loss functions for the channel approximation module 133 and/or the auto-encoder (e.g., the signal encoder network 123 and the signal decoder network 139) can be improved using stochastic gradient descent, genetic algorithms, or other related algorithms.

As noted above, in some implementations, loss calculation and update processes are performed jointly. For example, a combined update engine 147 can obtain data from the channel update engine 137 and the decoder and encoder update engine 143. The data can include loss functions for each as discussed above. The combined update engine 147 can minimize the combined loss function by sending updates to each of the channel update engine 137 and the decoder and encoder update engine 143. The updates can be configured to adjust weights or other parameters of the neural networks in the channel approximation module 133, the signal encoder network 123, and the signal decoder network 139. The adjusted weights can change the transmitted information approximation 141 and the received signal approximation 135 for one or more iterations of transmitted information 121 processed by the system 100. Using stochastic gradient descent, genetic algorithms, or other related algorithms, the combined update engine 147 can optimize the neural networks in the channel approximation module 133, the signal encoder network 123, and the signal decoder network 139 to reduce corresponding loss functions as described herein. Adjusting one or more networks, such as the signal encoder network 123 and the signal decoder network 139, can include adjusting one or more layers, weights, parameters, or connection of nodes of one or more constituent neural networks, among others.

In some implementations, loss calculation and update processes are performed iteratively. This is achieved, for example, by iterating back and forth between update operations and loss calculations as competing adversarial objectives, which affect each other during training. When iteratively updating, each loss (e.g., the loss from the channel approximation module 133 and the loss from the encoder and decoder networks 123 and 139) can be used independently. In such cases, weights, such as in one or more networks of the channel approximation module 133 may be fixed in place and not updated during an update process of the signal encoder network 123 and the signal decoder network 139. Similarly, weights such as in one or more networks of the signal encoder network 123 and the signal decoder network 139 may be fixed in place and not updated during an update process of the channel approximation module 133.

As show in FIG. 1, the signal decoder network 139 provides the transmitted information approximation 141 to the decoder update engine 143. The decoder update engine 143 further obtains the transmitted information 121 from the transmitted signal extraction module 119. The decoder update engine 143 compares the transmitted information approximation 141 generated by the decoder network 139 to the transmitted information 121. Based on a difference, referred to as L2 loss, between the transmitted information approximation 141 and the transmitted information 121, the decoder update engine 143 generates decoder updates 145. The decoder updates 145 are configured to adjust one or more parameters or weights of the decoder network 139. The decoder update engine 143 can include one or more algorithms including stochastic gradient descent, genetic algorithms, among others. In general, the decoder updates 145 are configured to adjust the decoder network 139 such that subsequent approximations of transmitted information match more closely to known transmitted information.

In some implementations, difference generation for updating one or more networks includes Kullback-Leibler divergence (KL-divergence). For example, one or more of the update engines, e.g., the decoder and encoder update engine 143, the channel update engine 137, and/or the combined update engine 147, can use KL-divergence to determine a difference between two or more values. The decoder and encoder update engine 143 can determine a difference between the transmitted information approximation 141 and the transmitted information 121 using KL-divergence. The KL-divergence can be used to determine the decoder updates 145 or encoder updates 127 (e.g., greater KL-divergence corresponds to greater adjustments executed by the decoder updates 145 or encoder updates 127). KL-divergence can similarly be used to calculate difference and corresponding updates for the channel update engine 137 and the combined update engine 147.

In addition to, or instead of, generating decoder updates 145, the decoder and encoder update engine 143 can generate encoder updates 127 for the signal encoder network 123. In such cases, the decoder and encoder update engine 143 can jointly or iteratively update the signal encoder and signal decoder networks 123 and 139. For example, as noted above, the parameters of the signal encoder network 123 can be adjusted while the parameters of the signal decoder network 139 are stable and vice versa. The parameters for each of the signal encoder network 123 and the signal decoder network 139 can also be adjusted simultaneously. Various techniques, including stochastic gradient descent, backpropagation methods, among others, can be used to determine changes to weights or parameters within either the signal encoder network 123, the signal decoder network 139, or both the signal encoder network 123 and the signal decoder network 139. In general, encoder updates 127 can be configured to adjust the encoder network 123 such that subsequent approximations of transmitted information match more closely to known transmitted information.

Similarly, the channel approximation module 133 can be updated by the channel update engine 137. Training of the channel approximation module 133 is discussed in detail in reference to later figures. FIG. 1 shows how the training of the channel approximation module 133 can be performed jointly or iteratively with the combined update engine 147. As indicated previously, both the channel update engine 137 and the decoder and encoder update engine 143 can generate loss values indicating a difference between a simulated or approximated value and a known value. For example, the channel update engine 137 obtains the received signal 117 and the received signal approximation 135, and computes a difference, or loss, between these, which is referred to as L1 loss. Based on the L1 loss, the channel update engine 137 generates channel updates 138 over one or more training iterations. The channel updates 138 are configured to adjust one or more parameters of the channel approximation module 133 including parameters of one or more networks included in the channel approximation module 133. By doing so, the channel updates improve the accuracy of the channel approximation by reducing the difference between the received signal 117 and the received signal approximation 135.

As discussed, the decoder and encoder update engine 143 generates a difference between an approximation of transmitted information 141 and the actual transmitted information 121. In some cases, this difference, or loss, can be provided, together with the difference computed by the channel update engine 137, to the combined update engine 147. The combined update engine 147 can combine the L2 loss corresponding to the encoding and decoding and the L1 loss corresponding to the channel approximation to generate a combined loss, referred to as LC. Similar to the channel update engine 137 and the decoder and encoder update engine 143, the combined update engine 147 can include one or more algorithms, such as stochastic gradient descent algorithms, genetic algorithms, backpropagation algorithms, among others to determine parameter changes to the networks (e.g., the signal encoder network 123, one or more networks of the channel approximation module 133, and the signal decoder network 139). In general, the parameter changes can be configured to reduce the differences obtained by the combined update engine 147, including L1, L2, and LC, improving the accuracy of the channel approximation while also improving the efficiency of the encoding and decoding in networks 123 and 139.

As mentioned previously, in some implementations, each of the signal encoder network 123 and the channel approximation module 133 includes one or more neural networks. In some implementations, the signal decoder network 139 includes one or more neural networks. As noted previously, in some implementations, one or more operations described as performed by the device 115 are performed by a device communicably connected to the device 115, e.g., a server or dedicated hardware processor such as a Field-programmable Gate Array (FPGA).

In some implementations, one or more of the encoder network 123, decoder network 139, or the channel approximation module 133, take the form of a series of dense (or strided or sparse in some cases) matrix multiplications with weights, addition of biases, summations of combinations of these products, and the application of non-linear functions on the output, such as rectified linear units (ReLU) or sigmoid functions. In some implementations, the system 100 includes an encoder, such as the encoder network 123 or a corresponding encoder used by the device 101, that generates encodings for one or many antennas, a wireless (or wired) channel or set of analog components with multiple inputs and multiple outputs (MIMO), or a decoder network, such as the decoder network 139, with multiple receive antennas, or any suitable combination of these. In this way, the systems, including the system 100, described herein along with training processes is applicable directly to MIMO and massive MIMO systems, such as for candidate cellular fifth generation (5G), 5G+, sixth generation (6G), or 6G+, waveform design, optimization and deployment.

In some implementations, the encoder network 123 and decoder network 139 leverage prior knowledge about efficient network structures (such as connectivity of activations, layers or weights), methods of synchronization, estimation, or attention to assist in the task of scaling these networks to efficient, high-performance operation. In this context, attention refers to the ability to focus resources on a certain subset of data, or to synchronize or canonicalize subsets of information from the original received information, often in a learned way.

Figure 2:
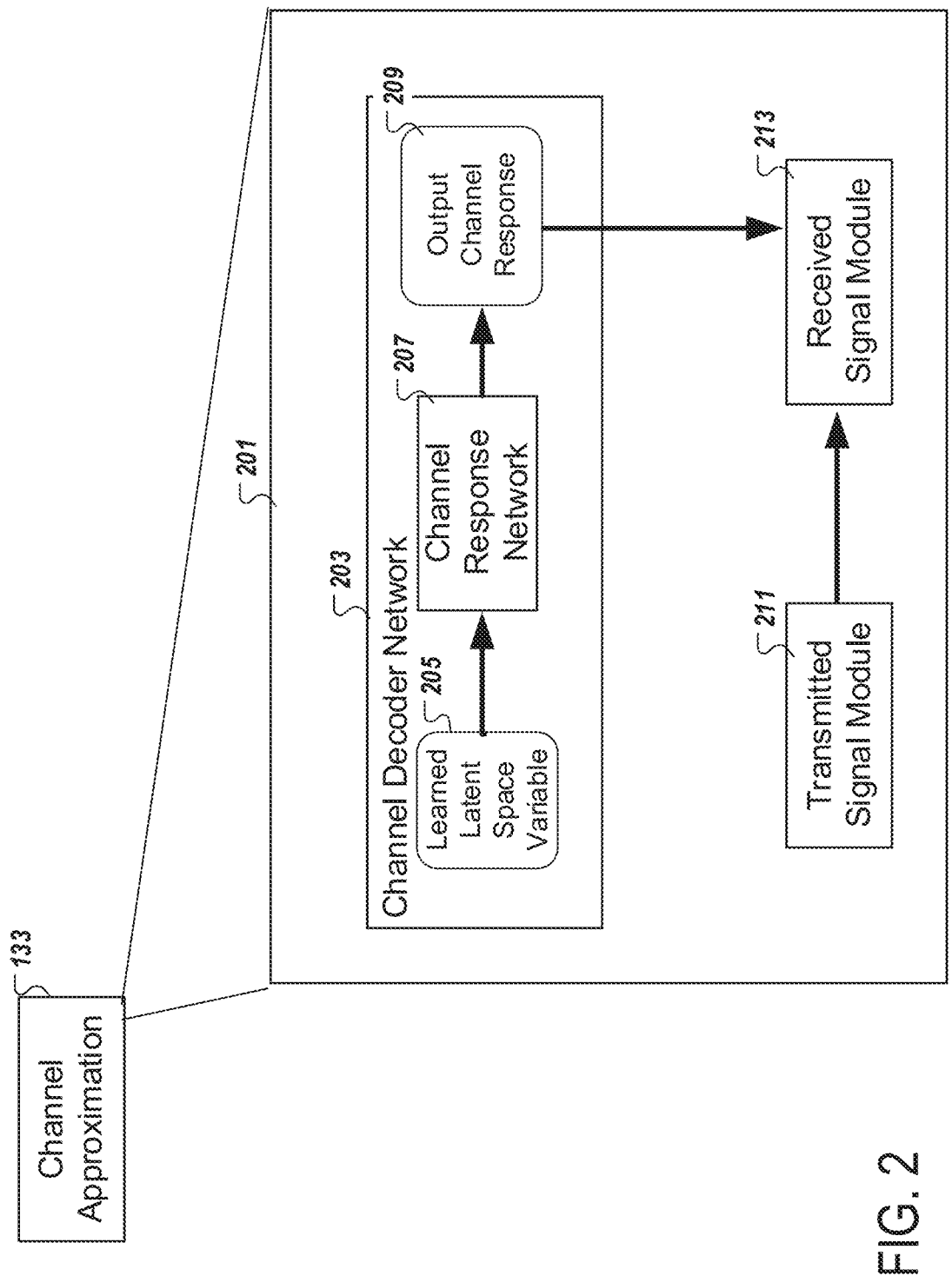
FIG. 2 is a diagram showing an example of a channel approximation system including a channel decoder network to generate simulated channel responses.

FIG. 2 is a diagram showing an example of the channel approximation system 133 including a channel decoder network 203 to generate simulated channel responses. The decoder network 203 includes a channel response network 207. In some implementations, the channel response network 207 includes one or more neural networks. The decoder network 203 uses the channel response network 207 to generate an output channel response 209 based on an input learned latent space variable 205. The output channel response 209 is used to determine the effects that an environment (e.g., as discussed with respect to FIG. 1) may have on a given signal propagating within the environment. For example, in some cases, the output channel response 209 represents the frequency response of frequencies propagating within a system from a transmitter (e.g., device 101) to a receiver (e.g., device 115). The learned latent space variable 205 represents a low dimensional data variable based on a number of obtained channel responses in the environment. The latent space is a feature space (e.g. a learned vector space such as a 32 dimensional numerical value which encodes a transformed encoding of the channel—such as can be constructed from a channel or used to reconstruct a channel) from which values of the variable 205 are drawn. The process of generating the variable 205 from channel response data can be represented as a dimension reduction problem. For example, a channel response can include many dimensions representing a wide range of power levels for each frequency in a wide range of frequencies. The lower dimensional latent space variable 205 represents characteristics of the higher dimensional channel response data with fewer variables (e.g., 32 integers in a vector). In some implementations, a device, such as the device 115, can train the channel approximation module 133 and determine a learned latent space variable 205.

The decoder network 203 provides the output channel response 209 to the received signal module 213. The received signal module 213 obtains a signal to be transmitted, or a copy of a signal that has already been transmitted, from the transmitted signal module 211. For example, in the context of FIG. 1, the transmitted signal module 211 can obtain the encoded information 129. The received signal module 213 can generate the transmitted information approximation 141 using the output channel response 209 and the encoded information 129. In some cases, operations of the channel decoder network 203, the transmitted signal module 211, and the received signal module 213 can be performed by one or more computers executing the instructions performing operations of the channel approximation module 133 in FIG. 1.

The received signal module 213 can perform one or more operations to determine a received signal approximation, such as the received signal approximation 135 of FIG. 1, using the output channel response 209 and a signal to be transmitted from the transmitted signal module 211, e.g., the encoded information 129. In some implementations, the received signal module 213 performs a convolution of the signal to be transmitted and the output channel response 209 to generate a received signal approximation, e.g., the received signal approximation 135 of FIG. 1. The received signal approximation approximates a signal as it would be received by a receiver after being transmitted by a transmitter and affected by one or more environmental effects.

Figure 3:
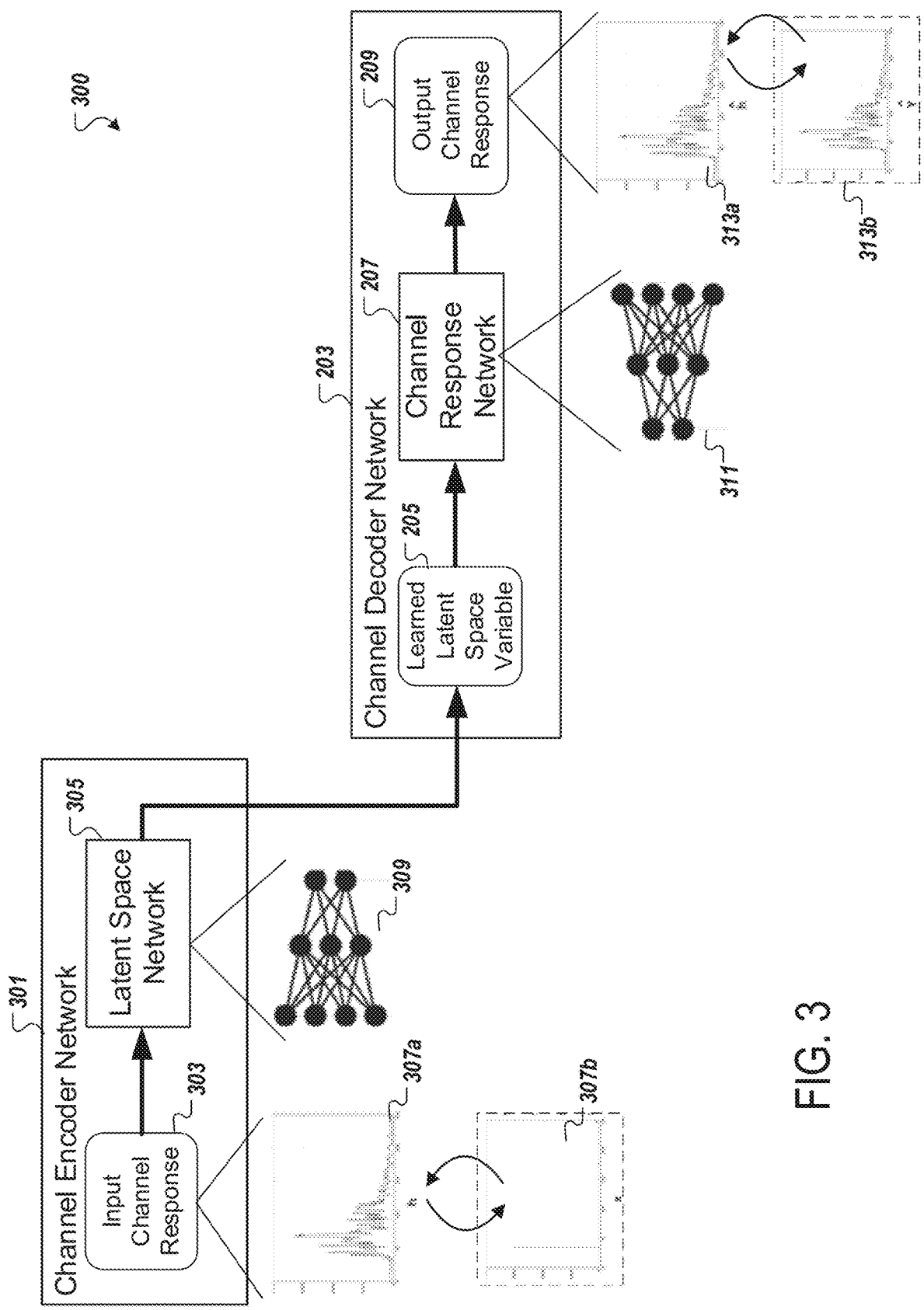
FIG. 3 is a diagram showing an example of a system including a channel encoder network and a channel decoder network for generating a learned latent space variable from which to generate simulated channel responses.

FIG. 3 is a diagram showing an example of a system 300 including a channel encoder network 301 and the channel decoder network 203 for generating the learned latent space variable 205 which is used to generate simulated channel responses, such as the output channel response 209. The channel encoder network 301 includes a latent space network 305, which is one or more neural networks, to determine the latent space variable 205 from a latent space. In some implementations, the channel encoder network 301 is realized by one or more computers configured to perform operations of the channel approximation module 133, for example, by executing software instructions corresponding to operations of the channel encoder network 301, including the operations of the latent space network 305.

Figure 4:
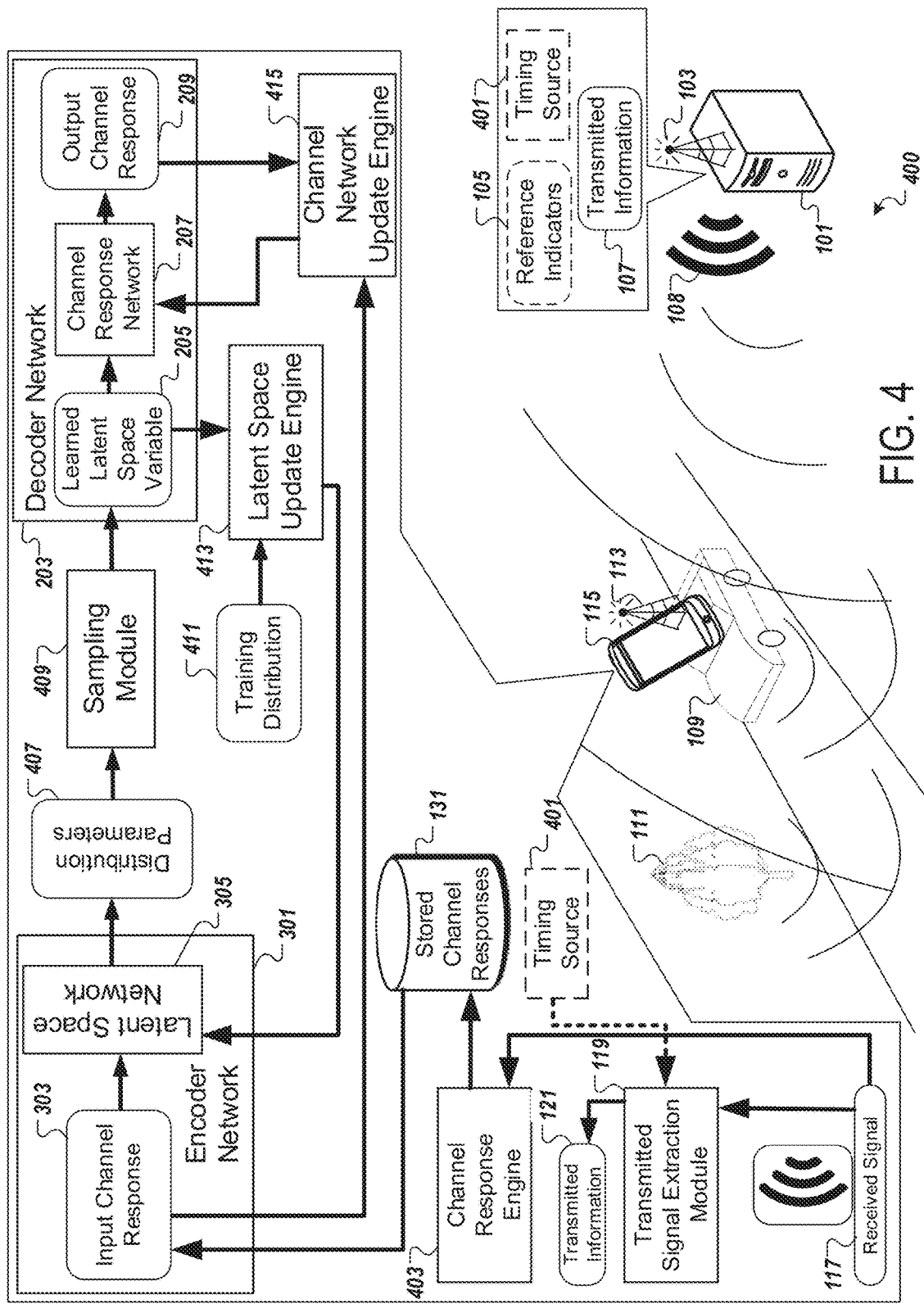
FIG. 4 is a diagram showing an example of a system for obtaining channel responses and training a channel encoder network and channel decoder network of a channel approximation system.

The channel encoder network 301 can be trained with the channel decoder network 203, as shown in FIG. 4, to generate the learned latent space variable 205. The learned latent space variable 205 can include one or more vectors. In some implementations, the learned latent space variable 205 is adjusted over time to mirror the evolution of propagation effects over time. For example, the learned latent space variable 205 can correspond to a set of values. The set of values can be included in one or more vectors. For each operation of the channel decoder network 203, a variable within the set of values, or a vector within a set of one or more vectors, can be used as the learned latent space variable 205 as input for the channel response network 207. In this way, the variability of an environment can be accurately captured within simulated channel responses to improve channel approximation.

The input channel response 303 is shown graphically with image 307a, which illustrates a sample input channel impulse response, referred to as "h" and described in greater detail below, where power levels over a range of frequencies are indicated as a line graph. The latent space network 305 is represented graphically with image 309, which illustrates a neural network structure having multiple nodes in connected layers. Similarly, the channel response network 207 of the channel decoder network 203 is represented graphically by image 311, illustrating a neural network structure having multiple nodes in connected layers. Image 313a shows a graphical representation of the output channel impulse response 209, referred to as ĥ and described further below, which is an approximation of the input channel impulse response 303.

The example system 300 of FIG. 3 can be used for a variational auto encoder (VAE) based training approach for channel modeling and training the channel approximation module 133. The system 300 provides an alternative method for channel emulation which utilizes a variational auto encoder in addition to, or in replacement of, a generative adversarial network (GAN) approach to generate simulated channel responses. In this case, channel impulse response "h," which represents the complex or real values of power received at different delays for one or more antennas, is encoded into a latent variable 205, which can be referred to as "z" (typically of lower dimension), through an encoder network or variational encoder network shown in FIG. 3 as the latent space network 305. In this context, variational refers to a "re-parameterization trick" or sampling layer within the neural network, which draws random values where specific properties that define the random distribution or properties of the random distribution, e.g., mean and variance are defined by activations or intermediate values within the neural network.

In FIG. 3, the channel impulse response "h" is shown, e.g., image 307a, to be a single power delay profile, but in many cases, an N×M MIMO channel delay response may be represented (where N and M are positive integers), or a complex valued (e.g., quadrature baseband sampled) delay response may be represented as well. A decoder network, or variational decoder network, shown as the channel response network 207 in FIG. 3, is used to reconstruct output channel impulse response "ĥ" from the latent variable 205 or "z", as an estimate of the input channel impulse response 303 (h). Since "z" can be a random distribution formed from the variational encoder of the latent space network 305, (or in some cases ĥ is formed from a variational decoder, such as the channel response network 207), ĥ may be considered as a stochastic random function of this distribution of "z".

To train the channel response network 207, a reconstruction loss such as the mean-squared error (MSE) between h and ĥ (or other similar intermediate values, e.g., values that indicate a difference between an input response and an output response) may be used, and in some cases an additional loss term (e.g., a f-divergence based loss) may be used, for example to enforce distribution properties over the latent space "z" from which the variable 205 is generated. The enforced distribution properties can help ensure the distribution is not a fixed distribution but has the desired properties.

By training such a system with a set of measured or simulated channel responses "h", such as the input channel response 303, a generator may be created in the form of the decoder network, e.g., the channel response network 207, which converts random latent distributions, represented by variable "z," into estimated channel responses "ĥ". When the variational network takes the form of the encoder, e.g., the latent space network 305, the encoder network produces intermediate values, which may include a mean, variance, log variance, among others, of a set of distributions such as the normal distribution, which are then sampled during each forward inference pass to form another set of activations within the latent space network 305. These may form the latent variable "z" directly in some cases, or may pass through one or more additional neural network layers including linear or non-linear activations such as rectified linear unit (ReLU) or parametric ReLU (PReLU) activations, to form a value for "z" or a random distribution over "z" for one or more inputs "h".

In some implementations, a variational auto encoder (VAE) can be trained using transmit (Tx)/receive (Rx) data pairs, or from estimates of channel responses obtained from channel sounding devices. In this case, the input channel response 303 is replaced with transmitted values, shown graphically in image 307b, and the output channel response 209 is replaced with received values, shown graphically in image 313b. For example, raw input and output data for the channel, shown graphically as image 307b, "x", and image 313b, "y", respectively, are considered directly, rather than channel impulse (or delay) response values "h." In some cases, training with transmitted values, instead of channel response data, can result in more accurate approximations of communication channels with non-linear relationships between transmitted and received values.

In some of these cases, sounding data with transmitted values "x", and received values "y" after passing through one or more communications channels are used to model the full stochastic relationship function between x and y. While the channel impulse response "h" is used in many systems to reflect a linear relationship between x and y, a non-linear relationship exists between input and output of a channel. By directly training a VAE between channel inputs and outputs, a non-linear relationship may be learned between the two. While VAE can consider the input and output to be the same value, in some cases it may include a regression task of regressing the channel output from the channel input.

In some cases, the term "auto" in VAE may generally refer to mean auto-regression of the same "transformed" value through a channel function. This another method for channel simulation can learn relationships between the channel input x and the channel output y, which are typically not captured in response value "h," but can be trained similarly using a VAE approach. In some cases, a discriminator network is used in conjunction with this VAE training process as well, where multiple losses such as reconstruction, VAE loss, and generator/discriminator loss can all be traded off against each other at different magnitudes to best produce a channel emulation approximation function.

As shown, the channel encoder network 301 encodes the input channel response 303, shown graphically in image 307a, into the variable 205 using the latent space network 305. For example, in some implementations, the latent space network 305 can include a variational auto-encoder (VAE). In this context, variational refers to a re-parameterization operation or a sampling layer within the neural network, which draws random values where specific properties that define the random distribution or properties of the random distribution, e.g., mean and variance, are determined by activations or intermediate values within the neural network. The latent space network 305 can learn a latent space distribution based on one or more obtained channel responses, including the input channel response 303, based on properties of the obtained channel responses. In some implementations, the latent space is random. In some implementations, the latent space is determined based on characteristics of the latent space network and the input channel response 303. Activations within the latent space network 305 can represent parameters of a numerical distribution, e.g., mean and variance, from which values are sampled to generate the learned latent space variable 205.

In some implementations, the channel decoder network 203 is trained to reconstruct the input channel response 303 using the learned latent space variable 205. For example, the channel decoder network 203 generates the output channel response 209 indicating complex or real values of power received at different delays for one or more antennas that is similar but not identical to the input channel response 303. The output channel response 209 can indicate another possible channel response that could be obtained in an environment from which the input channel response 303 was obtained. In this way, the channel decoder network 203 can simulate channel responses for particular environments or act as a model to perform testing or analysis. The output channel responses generated by the channel decoder network 203 are more accurate than static models that typically assume linear impairment effects within a communication channel.

In some implementations, the input channel response 303 used in the channel encoder network 301 is obtained from real world receivers receiving transmissions from real world transmitters. In some cases, instead of real-world channel responses, the channel encoder network 301 can use simulated responses. Where the input channel response 303 represents a frequency response of a real-world communication channel, the input channel response 303 can be generated using a transmitted signal and a received signal. The response 303 can indicate a channel effect that accounts for the change between the transmitted signal and the received signal, e.g., the signal 108 and the received signal 117. FIG. 4 shows an example of collecting real world channel effects by obtaining received signals and transmitted signals as well as training of the channel encoder and decoder network 301 and 203 using the obtained real world channel responses.

FIG. 4 is a diagram showing an example of a system 400 for obtaining channel responses and training a channel encoder network and channel decoder network of a channel approximation system, for example, training the channel encoder network 301 and the channel decoder network 203 of the channel approximation module 133. Similar to the system 100 described with respect to FIG. 1, in the system 400, a signal 108 is sent from the device 101 to the device 115. As shown, in some cases, the device 115 is onboard a vehicle 109 that is moving. The device 115 can move within an environment capturing transmitted signals to generate channel responses, which may change depending on the relative location of the device 115 and the device 101. The received signal 117 can include the signal 108 as well as other signals from other transmitters in the environment.

As described in FIG. 1, the transmitted signal extraction module 119 of the device 115 extracts the transmitted information 121 that matches the transmitted information 107 from the received signal 117. A channel response engine 403, which can be realized, e.g., as software routines implemented by the device 115 or a device communicably connected to the device 115 (e.g., a server) by executing one or more program instructions using one or more computers, obtains the transmitted information 121 and the received signal 117 to determine or generate a channel response of the wireless communication channel through which the signal 108 is propagated from the transmitter device 101 to the receiver device 115, and stores the channel response in the stored channel responses 131. The channel response engine 403 can generate the channel response corresponding to the signal 108 based on the received signal 117. For example, the channel response engine 403 can generate the channel response by determining the power levels and/or impulse responses or frequency domain fading profile for a range of frequencies corresponding to the received signal 117.

As discussed with respect to the system 100 of FIG. 1, the device 101 can include reference indicators 105 in the signal 108 to aid the transmitted signal extraction module 119 in extracting the transmitted information 121. In some implementations, the device 110 uses a timing source 401 to generate the signal 108, and the same or similar timing source 401 is accessible to the device 115. In some case, the timing source 401 can be a signal from a test signal generator with a known pulse per second. In some cases, the timing source 401 can be an external timing source available to both the device 101 and the device 115. For example, the timing source 401 can be timing from a global positioning system (GPS) signal. The timing source 401 can provide common timing to both the device 101 and the device 115.

Because of the common timing source, the sampling times of the converters (e.g., analog to digital converters or digital to analog converters) are known to be nearly the same (e.g., the sampling times of the converters may be within some error tolerance such as less than 1 nanosecond (ns) of timing jitter). Accordingly, the transmitted signal extraction module 119 can perform alignment on the received signal in both time and frequency. The transmitted signal extraction module 119 can recover the encoded and transmitted signal through a process of aligned signal association. For example, a time-aligned, and possibly frequency-aligned, signal is extracted from the received signal 117 as a representation of the transmitted information 107, using the knowledge of timing being identical from the digital to analog converter of the device 101 and the analog to digital converter of the device 115. The extracted signal is associated with the transmitted information 107 and the received signal 117, for example forming a tuple of (s, r), where s is the transmitted information 107 and r is the received signal 117.

In some implementations, the channel response engine 403 generates a channel response using analog versions of transmitted and received information. In some implementations, the channel response engine 403 generates a channel response using digital versions of transmitted and received information (e.g., the received signal 117). In some implementations, the channel response engine 403 generates a channel response using either an analog or a digital version of transmitted information and either an analog or a digital version of received information.

In some implementations, in addition to the wireless transmission, the device 101 sends the transmitted signal 108 to the device 115 as part of another communication. For example, the device 101 can also send the transmitted signal 108 using a wired communication medium to the device 115. In such cases, the device 115 can have a copy of the transmitted signal 108, without performing operations to determine the transmitted information 121 or generate the transmitted signal 108 based on the transmitted information 121.

The device 115 trains the channel encoder network 301 and the channel decoder network 203 using the stored channel responses 131. The stored channel responses 131 can include one or more channel responses generated by the channel response engine 403. The device 115 selects a channel response from the stored channel responses 131 and provides the selected channel response as the input channel response 303 to the encoder 301. In some implementations, all stored responses are selected and iterated through during training. In some implementations, the channel responses in the stored channel responses 131 are sorted and the device 115 (or another computer, e.g., a server, configured to train the encoder and decoder network), selects the responses and performs sequential or parallel training iterations in a ranking order. Ranking can be based on quality of the response data, e.g., prioritizing instances where antennas were not malfunctioning, or a response was within a range of typical responses for an area. The channel encoder network 301 provides the input channel response 303 to the latent space network 305.

In the example of FIG. 4, the latent space network 305 generates distribution parameters 407 (e.g., mean, standard deviation, variance, among others) and provides the distribution parameters 407 to a sampling module 409. The sampling module 409, which can be realized, e.g., as software routines implemented by the device 115 or a device communicably connected to the device 115 (e.g., a server) by executing one or more program instructions using one or more computers, selects values from a distribution specified by the distribution parameters 407. For example, the distribution parameters 407 can specify a normal distribution. The values selected from the distribution can include integers, real numbers, complex numbers, among others. The sampling module 409 can then sample values to generate the learned latent space variable 205 from the normal distribution indicated by the parameters 407. In some implementations, the sampling module 409 randomly selects values from the distribution defined by the parameters 407. For example, the sampling module 409 includes one or more randomization algorithms. The one or more randomization algorithms can select one or more values from within a distribution of values defined by the parameters 407.

The learned latent space variable 205 generated by the sampling module 409 is provided to the channel decoder network 203. The channel response network 207 generates an output channel response 209 using the learned latent space variable 205 based on one or more neural networks implemented in the channel response network 207.

The channel decoder network 203 provides the learned latent space variable 205 and the output channel response 209 to various update engines to train the channel encoder network 301 and the channel decoder network 203. For example, the channel decoder network 203 provides the learned latent space variable 205 to the latent space update engine 413. The latent space update engine 413 accesses a training distribution 411. The latent space update engine 413, which can be realized, e.g., as software routines implemented by the device 115 or a device communicably connected to the device 115 (e.g., a server) by executing one or more program instructions using one or more computers, compares the learned latent space variable 205 to the training distribution 411.

In some implementations, the latent space update engine 413 compares the distribution specified by the distribution parameters 407 to the training distribution 411. For example, the latent space update engine 413 can randomly sample from the distribution specified by the distribution parameters 407 and compare the random sampling with the training distribution 411. The latent space update engine 413 can compare the random sampling with the training distribution 411 by random sampling from the training distribution 411 are determining if one or more values of the random sampling is within the training distribution 411. Random sampling to compare distributions can be useful if the distributions do not confirm to a mathematical model of a distribution. In some cases, the latent space update engine 413 compares the distribution parameters 407 with parameters defining the training distribution 411. Based on a difference between the data corresponding to the training distribution 411 and data corresponding to the latent space variable 205, the latent space update engine 413 can update the latent space network 305.

In some implementations, the training distribution 411 is a normal distribution. The latent space update engine 413 can generate a loss metric indicating the amount of difference between the learned latent space variable 205 and the training distribution 411. Using the loss metric, the latent space update engine 413 can update the latent space network 305, e.g., by adjusting one or more parameters, layers, or weights, of one or more neural networks of the latent space network 305. By restricting the flexibility of the learned latent space variable 205 according to the training distribution 411, the system 400 prevents the latent space network 305 from over-specifying the distribution within a latent space provided by the distribution parameters 407 leading to latent space variables that are not general enough for efficient and accurate channel responses. In general, the latent space engine 413 can adjust the latent space network 305 to generate distribution parameters more similar to the training distribution 411 and thus sampled values of variables, e.g., variable 205, that are more likely included in the training distribution 411.

The channel decoder network 203 provides the output channel response 209 to the channel network update engine 415, which also obtains the input channel response 303 from the encoder network 301. Another restriction for training the channel approximation module can include preventing the output channel response 209, which is simulated, from being more than a threshold difference from the input channel response 303. Simulated channel responses can be referred to as synthetic channel responses. The threshold can be set manually by a user or can be variably set using the variations of responses in an environment (e.g., a higher threshold for highly variable environments and a lower threshold for less variable environments). A simple percentage of all detected variability of responses in an environment can set the threshold or a grouping algorithm can determine a dynamic threshold based on the presence of closely related groups of responses (e.g., k-mean clustering, among others). In this way, the channel decoder network 203 can generate a set of simulated channel responses that correspond generally to an environment (e.g., exhibit similar power delay values for frequencies as real work channel responses) without requiring a large number of real world obtained channel responses.

In some implementations, the channel network update engine 415 compares the input channel response 303 to the output channel response 209. Based on a difference between the two determined by the comparison, the channel network update engine 415 can adjust the channel response network 207. In this context, adjusting a network, such as the channel response network 207, can include adjusting one or more layers, weights, parameters, or connection of nodes of one or more neural networks, among others. In general, the channel network update engine 415 can adjust the channel response network 207 to generate output channel responses that are more similar to the input channel response 303.

In some implementations, the learned latent space variable 205 includes fewer degrees of freedom compared to either the input channel response 303 or the output channel response 209. For example, the input channel response 303 can include power values for a number of different frequencies, e.g., 250 frequencies. However, the learned latent space variable 205 can be a vector that includes 32 values, e.g., representing the 250 frequencies in a dimensionally reduced form. By training the latent space network 305 to generate a distribution for sampling that characterizes the input channel response 303 with fewer degrees of freedom, the latent variable 205 can indicate fundamental features of a given communications channel that may not be readily apparent based on a set of captured real world channel responses. The number of values of the learned latent space variable 205 can be static or variably set during training to indicate a lowest number of values that achieve decoded channel responses with variability but that are similar to the input channel responses.

In some implementations, the encoder network 301 obtains particular properties of the communications channel, which can be used to tailor the latent variable 205 for specific conditions of a communication instance. For example, the propagation effects of the communications channel on a signal may depend on factors including climate, time of day, weather, moving objects in the vicinity of the transmitter or receiver or both, other signal transmissions, positions of the transmitter and receiver, among others. The device 115 or the device 101 can obtain location information, e.g., location of the transmitter, receiver, environmental objects, among others, as well as environment information to determine these factors. Information obtained by the device 101 can be sent to the device 115 in the signal 108 or another communication. Information obtained by the device 115 can be directly used in training. By recording these factors, the device 115 can determine properties of the communications channel, such as fading properties experienced by the signal, and train a system, including the decoder network 203, to generate simulated channel responses that are similar to real world channel responses in these conditions. Channel properties can also include, e.g., location, elevation, car driving by, room size, material properties, different frequency bands, among others).

For example, for a given set of channel properties, the decoder network 203 can generate a corresponding variable and output channel response. For example, the decoder network 203 can include a module that samples data, according to specific channel properties, from a distribution defined by the encoder network 301 for all channel properties or that obtains a particular distribution defined by the encoder network 301 for particular channel properties and samples data from that distribution to generate the learned latent space variable 205. In either case, the decoder network 203 can generate a learned latent space variable 205 that generates an output channel response that matches specific channel properties. The output channel response will be similar to real world channel responses corresponding to the same set of channel properties. If rain effects a certain frequency transmission, then, if recorded in the set of channel properties, a corresponding latent variable, as discussed above, can be generated according to one or more real world channel responses captured with these channel properties.

In some implementations, additional sensors on the devices 115 and 101, e.g., camera, humidity sensors, among others, can detect the channel properties and provide these properties for the generation of the distribution and the variable 205 based on the distribution. For example, a camera of the device 115 can recognize phenomena such as vehicles moving through the area of the sensors or the propagation environment, the presence of large or abnormal objects or reflectors in the area of the channel, the presence of other phenomena such as rain, fog, snow, sleet, fire, among others, which may affect conditions. In some cases, the sensing device may gather one or more of acoustic, sound, visual, infrared, ultra-sonic, temperature, or other radio activity data in the vicinity of the transmitter, channel or receiver that may impact the communications channel in some way or impact the received values. For example, while the receiver may measure a number of received channel estimates for a specific emitter, the sensor may recognize one or more instances where vehicles, reflectors, or other spatial anomalies are present in the environment, which may have significantly impacted the response of the channel and the resulting channel distribution experienced by the wireless system. By jointly collecting data representing these phenomena and the resulting effect on the wireless system, such phenomena can be more comprehensively captured, modeled, and represented within wireless communications systems and channel models.

Figure 5A:
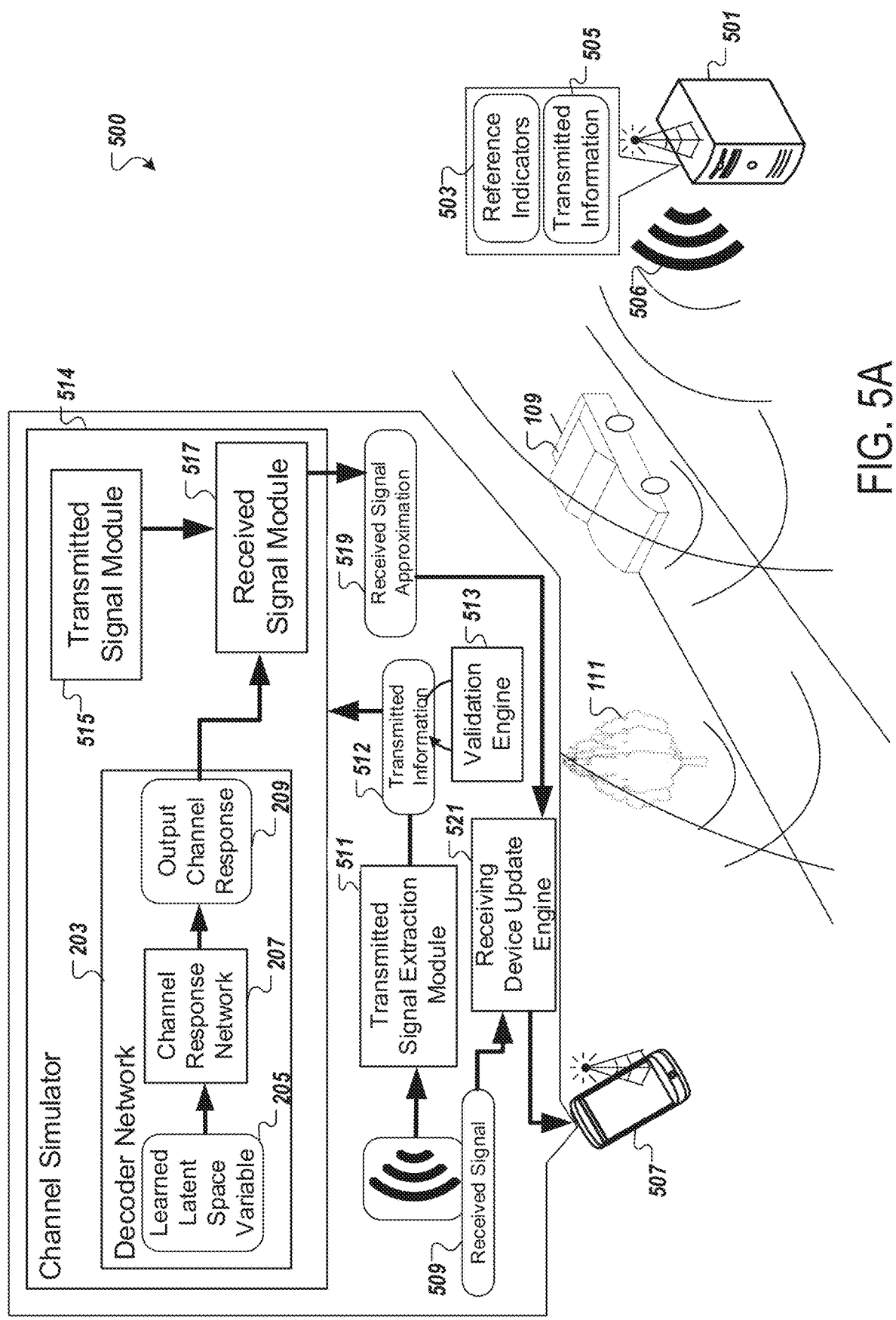
FIG. 5A is a diagram showing an example of a system for using a trained channel decoder network to update a receiver.

In a testing scenario, a device that includes the decoder network 203 can be used to test the reception of a test signal by a receiving device, e.g., device 507 of FIG. 5A. Either by using a standard latent space or using a latent space based on channel properties, a user can determine what a device should have received as indicated by a convolution of the channel response provided by the decoder network 203 and a signal to be transmitted, and the signal actually received by a receiver device. By comparison, a user can tune a receiving device to match the known signal to be received based on the processing of the decoder network 203. An example testing scenario is shown in FIG. 5A.

FIG. 5A is a diagram showing an example of a system 500 for using a trained channel decoder network 203 to update a receiver device 507. The system 500 includes device 501 and the device 507. Similar to the device 101, the device 501 sends a signal 506 including transmitted information 505 and/or reference indicators 503. Similar to the device 115, the device 507 receives the signal 506. As described in FIG. 1, the vehicle 109 and obstacle 111 are examples of objects that can affect the propagation of the signal 506 from the device 101 to the device 507. Using one or more signal processes, the device 507 generates the received signal 509. The device 507 may be in testing and may not produce a correct received signal based on the analog signal received by the antenna of the device 507. Using the channel simulator 514, the device 507 can check and update signal processes or provide an alert of a malfunctioning component, based on a received signal approximation 519 generated by the channel simulator 514.

The transmitted signal extraction module 511, similar to the transmitted signal extraction module 119, extracts transmitted information 512 that should match the transmitted information 505. FIG. 5A shows a validation engine 513 that can check to ensure that the transmitted information 512 is correct. The validation engine 513 can include a check sum operation where values in the received signal 509 or a portion of the received signal 509 are summed and compared to another value. If the sum does not match the other value, then the validation fails. If it does match, then the validation succeeds. If it fails, the device 507 can provide a notification to a user that validation failed and provide information about the signal 509, information 512, validation technique used, among others. If validation succeeds, the device 507 can provide the transmitted information 512 to the channel simulator 514.

In some implementations, the transmitted signal extraction module 511, the channel simulator 514, the validation engine 513, and the receiving device update engine 521 are realized, e.g., corresponding operations are performed, by the device 115 or a device communicably connected to the device 115, (e.g., a server) by executing one or more program instructions using one or more computers.

The channel simulator 514 obtains the validated transmitted information 512. The transmitted signal module 515 provides the transmitted information 512 to the received signal module 517. The decoder network 203, as discussed herein, provides the output channel response 209. In some implementations, the channel simulator 514 is similar to the channel approximation module 133. The decoder network 203 of the channel simulator 514 can be the same as the decoder of the channel approximation module 133 or a separate instantiation, e.g., a reproduction of the decoder of the channel approximation module 133 that is realized through copied computer instructions. The output channel response 209 can be specific to the current environment for the communication channel in which the signal 506 was sent from the device 501 to the device 507. As discussed herein, the channel response 209 can indicate specific power effects for frequencies as they propagate within an environment. The response 209 can vary over time. For example, the channel simulator 514 can adjust the variable 205 over time. When information, such as the information 512, is received, the channel simulator 514 can use a current variable 205 to generate a current response, such as the response 209. At a different time, e.g., for a subsequent transmission, the channel simulator 514 may adjust the variable 205 resulting in a different response 209.

The channel simulator 514 can adjust the variable 205 to reflect channel variations based on time, space, environmental factors, or other inputs which affect the propagation of signals within an environment over time. For example, propagation may be affected by changes to the atmosphere between day and night. The channel simulator 514 can vary the variable 205 over time so that the simulated channel responses generated for transmissions at night are similar to real world channel responses obtained by night transmissions and simulated channel responses generated for transmissions in the morning or afternoon are similar to real world channel responses obtained at the corresponding time (e.g., morning or afternoon).

Although a static model can be used, a static model cannot well approximate the variability of an environment over time. By adjusting the output channel response 209 over time according to real world changes in transmission effects, the channel simulator 514 can more accurately, compared to static systems, generate received signal approximations.

Figure 5B:
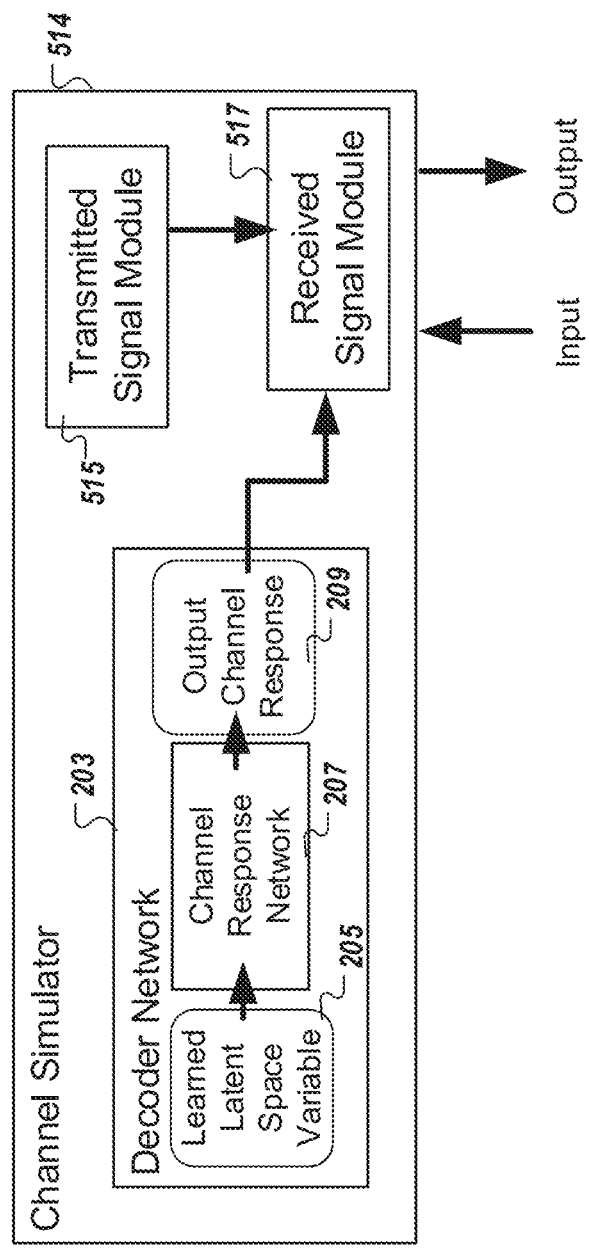
FIG. 5B is a diagram showing an example of a channel simulator.

The adaptability of the channel simulator 514 is shown in FIG. 5B. As a channel approximation, the channel simulator 514 can be used in any situation where a channel approximation may be useful in training one or more neural networks, testing equipment, or performing other analysis. Some examples of other uses, in addition to the use shown in FIG. 5A are discussed below.

In some implementations, the channel simulator 514 is used for development, lab tests, or other technical analysis. The computational complexity of inference of the decoder network 203 of the channel simulator 514 may be lower than traditional channel simulation methods, for example, sum of sinusoids methods that produce tapped-delay line (TDL) or other similar channels representing aggregates of individual fading components. By leveraging a more detailed learned VAE method for representing delay responses or output values by the channel simulator 514, more accurate and expressive channel emulations may be used for communication channel simulation, encoder/decoder design, or validation, among other uses.

In some implementations, the channel simulator 514 is used in training a channel encoder and decoder, such as encoder 123 and decoder 139 of FIG. 1. For example, input to the channel simulator 514 can include output from a signal encoder, such as encoder 123, and output of the channel simulator 514 can be provided to a channel decoder, such as decoder 139. The channel simulator 514 can introduce one or more effects. The effects may include, for example, combining Gaussian noise, sample or frequency offset, or additional permutations on an input or transformed input to obtain output. In some implementations, the decoder 203 in the channel simulator 514 generates approximate transmitted values from the received values, and can be directly optimized (e.g., as a channel autoencoder), to optimize information encoding and/or decoding networks, for performance improvements over the existing channel. The performance improvements can be for example, to minimize bit error rate, maximize throughput, maximize resiliency, minimize probability of detection, minimize or maximize confusion with other wireless phenomena, or a number of other objective functions.

In some implementations, the channel simulator 514 is used with traditional encoding methods, e.g., Quadrature amplitude modulation (QAM). For example, the channel simulator 514 can be used to optimize specific components of a communication system, such as elements of a receiver or elements of a transmitter. In some cases, a fixed protocol may be used by a transmitter or receiver, for example an Orthogonal frequency-division multiplexing (OFDM) waveform such as 4G LTE or 5G new radio (NR), Wi-Fi, or another protocol, wherein a full adaptation may not occur on both sides of the link, but a system may optimize one portion or component of the link or signal processing process while retaining standards compatibility or interoperability with the existing encodings.

In some implementations, the channel simulator 514 obtains input from a standard OFDM protocol. For example, a transmitter can encode information for input into the channel simulator 514 using a standard OFDM protocol, which, e.g., maps bits to Quadrature amplitude modulation (QAM) constellation points and encodes them across a set of OFDM subcarriers for transmission. Using such input, the channel simulator 514 can provide output for a non-typical system that may not be using a standard protocol. For example, the channel simulator 514 can provide output to a neural network, such as the decoder 139, to approximate transmitted information from a received approximation generated by the channel simulator 514. In this way, a decoding neural network can function with a standard protocol used for encoding a signal.

A decoding neural network obtaining output of the channel simulator 514 can perform a function of recovering transmitted signal values from received approximations generated by the channel simulator 514. The decoding neural network can perform compensation of time domain data to compensate for distortion or linearity before OFDM demodulation, a network which performs channel estimation and equalization (and/or decoding and symbols detection/bit decoding or content decoding), or another subset of the receive signal processing chain as a learned process.

Here, by training a network with the channel simulator 514, a wide range of decoding or encoding processes can be learned, which optimize for one or more approximated channel conditions that may reflect real world operating conditions and may allow improved wireless performance in the real world. In some cases, the learned latent space variable 205 may be leveraged to specialize encoding or decoding processes for certain channel conditions or properties of the system such as elevation, temperature, band, tilt, urban reflector density, among others, wherein the autoencoder may learn certain solutions or more optimal solutions for various properties in the environment.

In some implementations, the channel simulator 514 is used with a tapped delay line (TDL) based channel simulator. For example, the TDL based channel simulator can periodically capture path delay variation sent periodically over a Standard Commands for Programmable Instruments (SCPI) interface. Hybrid implementations with a TDL channel simulator allow for a lower rate sampling of the latent channel, while a high-rate TDL channel simulator for example can perform high-rate fading simulation (e.g. Rayleigh or Rician tap fading) of taps or clusters which are well defined on a short-time basis—which facilitate leveraging existing channel simulation primitives and implementation, and can also represent a wider range of channel conditions than a purely fixed TDL or cluster delay line (CDL) channel definition. In some implementations, the channel simulator 514, which can be based on a generative adversarial network (GAN) or a VAE, can be used with existing channel simulation hardware, software or algorithms in order to perform channel simulation, which may be challenging to achieve today using existing fixed TDL (time delay line) channel models.

In some implementations, the latent space corresponding to the learned latent space variable 205 is perturbed. For example, a VAE or GAN-based channel emulation process can continuously, or through a range of interpretable inputs to latent representation of the channel simulator 514, generate a rich set of distributions over signal delay spreads or channel responses, which may be seen in the channel under a range of conditions and mobility considerations such as transmitter, mobile, or ambient device mobility.

The VAE may be used to produce TDL tap realizations for periods of time such as 1 m, 5 ms, 10 ms, or 100 ms time-windows or otherwise. A more expressive VAE distribution may be used to produce a realistic set of TDL channel model properties for time periods that may be used to process one or more transmitted signals to produce output signals on finer time scales, for instance 1 ns sample times, among other suitable scales.

The channel simulator 514 can be used as an intermediate solution that allows hardware, such as FPGA channel simulators, to use existing TDL channel simulation routines to emulate channel responses, while using a machine learning (ML), GAN, or VAE-based distribution of the channel, which may be more accurate or may take into account significantly more information about the simulation, in order to update and drive the TDL simulation periodically.

In some cases, the channel simulator 514 can estimate and transmit a certain number of TDL taps or other parametric channel properties to an existing channel estimator over some protocol (e.g., a SCPI or Video Electronics Standards Association (VESA) test control interface) to existing test hardware to control and task its current operating mode. This may provide significant additional test and simulation ability to existing channel simulation software or hardware by providing a controllable and/or interpretable ML or VAE overlay to represent different channel conditions and phenomena on a device (e.g., the device 115). In some implementations, a controller simulates spatial trajectories or paths through an environment, sets of interferers such as vehicles or other spatial reflector phenomena in the environment, or a range of other interpretable latent conditions that could help drive the VAE driven updates to the parametric model (e.g., a TDL model) within a more traditional channel simulator at some intermittent time scale.

In some implementations, the learned latent space variable 205 is varied over time. For example, the channel simulator 514 can be used to produce a time-correlated channel realization by slowly varying a value within the latent space to produce a series of channel responses or channel output realizations which are correlated over time or other properties. The channel simulator 514 can select a value within a latent space. By selecting one or more values, the channel simulator 514 may perform a random walk or walk along a specific trajectory within the latent space over time in order to produce a similar set or correlated set of channel responses. As channel coherence time (or the time in which the response of the channel is similar) may be an important property within many wireless communication systems, this rate of movement within the latent space and resulting change within the channel response may be varied at a range of rates to reflect channel variations based on time, space, environmental factors, or other inputs which affect the channel correlation over time.

The received signal module 517 obtains a signal to be transmitted, based on the transmitted information 512, from the transmitted signal module 515. The signal can be analog or digital. The received signal module 517 performs one or more processes using the output channel response 209 and the signal from the transmitted signal module 515 to generate the received signal approximation 519 shown in FIG. 5A. For example, the received signal module 517 can perform a convolution, transformation, receiver algorithms, or other processing of the signal from the transmitted signal module 515 and the output channel response 209, and the result of the convolution or other processing stages can be provided as the received signal approximation 519.

Reverting to FIG. 5A, the received signal approximation 519 generates the signal that would be received by a properly functioning receiving antenna and device. By comparing the received signal approximation 519 and the received signal 509, the device 507 can determine adjustments to be made on the device 507. The receiving device update engine 521 is configured to perform just such a comparison between the received signal 509 and the received signal approximation 519. Based on the comparison, the receiving device update engine 521 can provide updates the device 507. Updates can include software updates to processes used to convert the signal 506 to the received signal 509, among others (e.g., this could involve weight updates to neural receivers on the device, weight updates to neural encoders or decoders on the devices, parameter updates to other signal processing algorithms or channel state feedback algorithms or other control and tuning of the device to help tune or improve its performance under the channel conditions).

In some implementations, the channel simulator 514 is a separate device communicably connected to the device 507. For example, the channel simulator 514 can be performed by one or more processors of a dedicated hardware device. Either through wireless or wired connection, the device 507 can provide information to the channel simulator 514 and obtain information in return.

Figure 6:
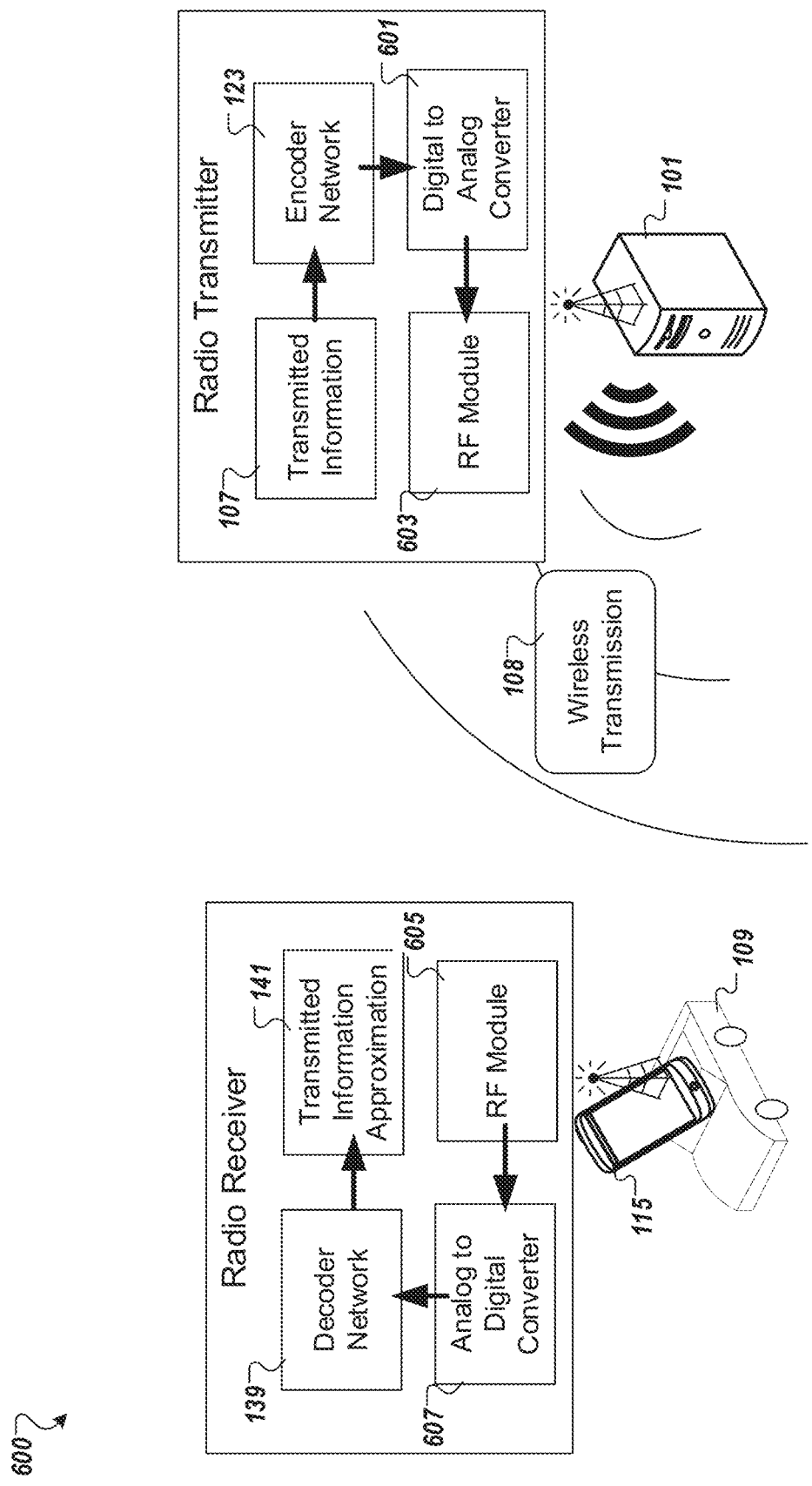
FIG. 6 is a diagram showing an example of a system for using a trained signal encoder network and trained signal decoder network to send and receive wireless transmissions.

FIG. 6 is a diagram showing an example of a system 600 for using a trained signal encoder network 123 and trained signal decoder network 139 to send and receive wireless transmissions. The devices from FIG. 1 are shown again for simplicity. The signal decoder and encoder networks shown trained in FIG. 1 are used in FIG. 6 for signal communication. The devices 115 and 101 can each include encoder and decoder networks to enable both reception and transmission for communication between them.

In the example of FIG. 6, the device 101 includes a digital to analog converter 601 and a radio frequency (RF) module 603. The digital to analog converter 601 converts the encoded information from the signal encoder network 123 to an analog signal for the RF module 603 to send as a wireless transmission signal 108. The RF module 603 includes suitable RF or intermediate frequency (IF) devices, such as one or more antennae, for transmitting wireless signals.

The device 115 includes an RF module 605 and an analog to digital converter 607. The RF module 605 includes one or more RF or IF devices, such as one or more antennae, for receiving analog signals, e.g., the wireless transmission signal 108 from the device 101. The analog to digital converter 607 generates a digital version of the analog signal 108. The signal decoder network 139 generates the transmitted information approximation 141 using the digital version of the signal 108 as described in FIG. 1.

Figure 7:
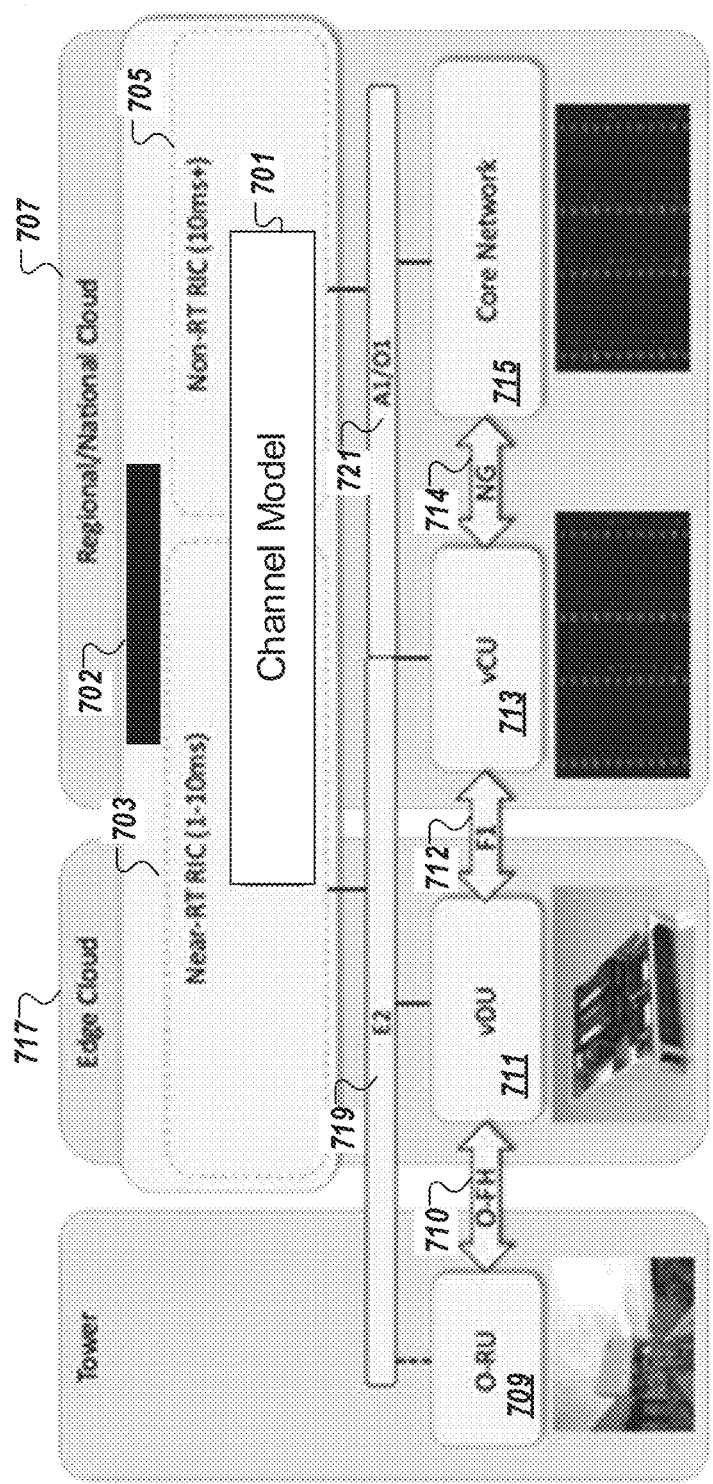
FIG. 7 is a diagram showing an example of a deployment scenario.

FIG. 7 is a diagram showing various physical components in an example of a deployment scenario. The deployment scenario of FIG. 7 can include channel modeling, learning, and/or emulation in a virtualized radio access network (vRAN) and/or a radio intelligent controller (RIC), or other cloud service. The example scenario shows that a channel model 701 (e.g., generated by a VAE, such as the channel model of the channel approximation module 133), or digital twin component as described herein, may be deployed as a component within a virtualized radio access network component, and in some cases within an Open Radio access network (OpenRAN) system.

The deployment scenario of FIG. 7 illustrates a RAN with virtualized elements. Components can be legacy components, open components, virtual components (e.g., running on a generic server), or physical components. For example, radio unit (RU) 709 can be a virtual RU (e.g., vRU) or a physical RU and can be open radio access network compliant or legacy radio access network compliant. This includes a RU 709, which provides analog transmission and reception and digital conversion; a distributed unit (DU) 711 (or baseband processing unit (BBU)), which provides an implementation of a portion of the physical layer and additional protocol processing (e.g. radio link control (RLC)/medium access control (MAC)); a centralized unit (CU) 713, which provides upper layer protocol processing (e.g. radio resource control (RRC), service data adaption protocol (SDAP) and/or packet data convergence protocol (PDCP) layers); a core network (e.g., NG Core) 715, which provides network services and interfaces; and a RAN Intelligent Controller (RIC) 702, which provides both Near-Realtime (RT) RIC 703 and Non-RT RIC 705 hosting for xApps and rApps, which can interface with various RAN components to optimize, tune, and control RAN functionality.

Also shown in FIG. 7 are interfaces within the RAN, Open Radio Access Network (O-RAN), and/or Virtual radio access network (V-RAN) deployment—including the Fronthaul interface or Open-Fronthaul interface (O-FH) 710 which carries data including time and/or frequency domain data of various antennas or spatial streams between the RU 709 and DU 711. The F1 interface 712 provides the interface between the DU 711 and CU 713 elements. The NG interface 714 often provides the interface between CU 713 and core network 715. Similarly, the near-realtime RIC 703 leverages several interfaces and protocols including the E2 interface 719 to pass data between elements including the DU 711, CU 713, and RU 709 to RIC xApps. The Non-realtime RIC 705 leverages interfaces such as the A1 and O1 interfaces 721 to interoperate with the CU 713 and Core 715 components and the rear-realtime RIC 703.

Each of the elements shown in FIG. 7 can be deployed across the actual deployment edge of the radio, an edge-cloud hosting servers near to the radio-edge, a regional-cloud which is somewhere in the vicinity of the edge-cloud but can be at a distance, and a national cloud which often has one or several locations within a country or operating area which connect out to regional and edge components. These have been illustrated roughly with their association with RAN component placement but may vary to some degree depending on deployment considerations. In some deployments various splits such as 8, 7.2, 7.2c, 7, 6, among others may occur in which RU 709, DU 711 and CU 713 functionality is merged in some cases. Similarly, interfaces such a network functional application platform interface (nFAPI) may be used to split Physical layer (PHY) and Media Access Control address (MAC) components along different splits than the ones shown in FIG. 7.

Here, a set of software routines is deployed into a server or cloud compute engine, which may be realized in a RIC 702 xAPP, within near-RT RIC 703 or the non-RT RIC 705, within another cloud service or compute server, or within a central unit (CU) core 713, or collocated within another embedded compute device within the RAN. CU 713 deployment can be realized within an edge cloud 717 or regional/national cloud 707 where the regional/national cloud 707 can perform operations for communication across a region or nation. Here, the channel model 701 is able to incorporate updates or measurements into the channel model that are provided by one or more of radio units (RUs), e.g., RU 709, distributed units (DUs), e.g., DU 711, or central units (CUs), e.g., CU 713. In some cases, the first layer within the DU 711 might provide measurement data such as channel state information or channel response estimates along with metadata about user equipments (UEs) over a network protocol such as Internet Protocol (IP), Transmission Control Protocol (TCP), User Datagram Protocol (UDP), Stream Control Transmission Protocol (SCTP), or another protocol that transmits this data to the channel modeling software.

In some cases, the data may transit a database first, or the DU 711/CU 713/RU 709 may store the data more locally and be queried by, or query, the channel modeling software to obtain this information. In other cases, the UE may provide this information over a TCP/IP, UDP, SCTP, or a similar network protocol to a network service, which stores channel information and/or channel quality information. In some cases, this network service may run in a cloud, RIC, xAPP, or elsewhere. The network service can provide simulation and propagation modeling information, which can be used to determine information regarding interference between devices or sectors, information regarding coverage areas, or predicting link quality over network areas or future network planning information, link quality information over potential physical paths through the network, for example, to predict link reliability, throughput, latency, or other suitable parameters.

Using such a network service may be useful within industrial deployments, such as private 5G networks, wherein industrial manufacturing or monitoring devices need to ensure their paths are reliable and will not experience degradation during important industrial activities such as sensitive and low latency manufacturing routines. Similarly, channel simulations such as generative channel model simulations, where a VAE as described herein is replaced with a generative model for channel simulation, may be used to updated L1 signal processing routines, such as channel estimation, equalization, MIMO/single-input and multiple-output (SIMO)/multiple-input and single-output (MISO) combining or transmission, or scheduling of temporal-spatial-spectral resources such as multi-user MIMO (MU-MIMO) or single-user MIMO (SU-MIMO) resource block assignment within a 4G, 5G, or 6G wireless cellular system or a Wi-Fi System.

In such cases, the cloud resource may provide simulation and training based on the generative channel model that provides updates to a range of neural network and/or non-neural network models, which may include weights or other parameters used to help drive L1 signal processing routines or schedule routines or other signal cancellation, reception, or allocation schemes to optimize for radio and communication signal processing or system level performance metrics.

In some cases, these deployed channel simulation systems may take the form of a hierarchy, where certain simulations or digital twins may represent specific sectors, towers, or user-equipment performance, in which the simulation systems may also represent higher orders of hierarchy, such as the behavior of multiple UEs, multiple sectors, multiple towers, or even multiple regions. There may be transports or sharing of measurements, models, weights or other representations of these models between different levels of the hierarchy to leverage local or global experience, or both, and/or predictions, models, and other knowledge about wireless propagation or other system performance or properties, both upwards and downwards within this hierarchy.

Figure 8:
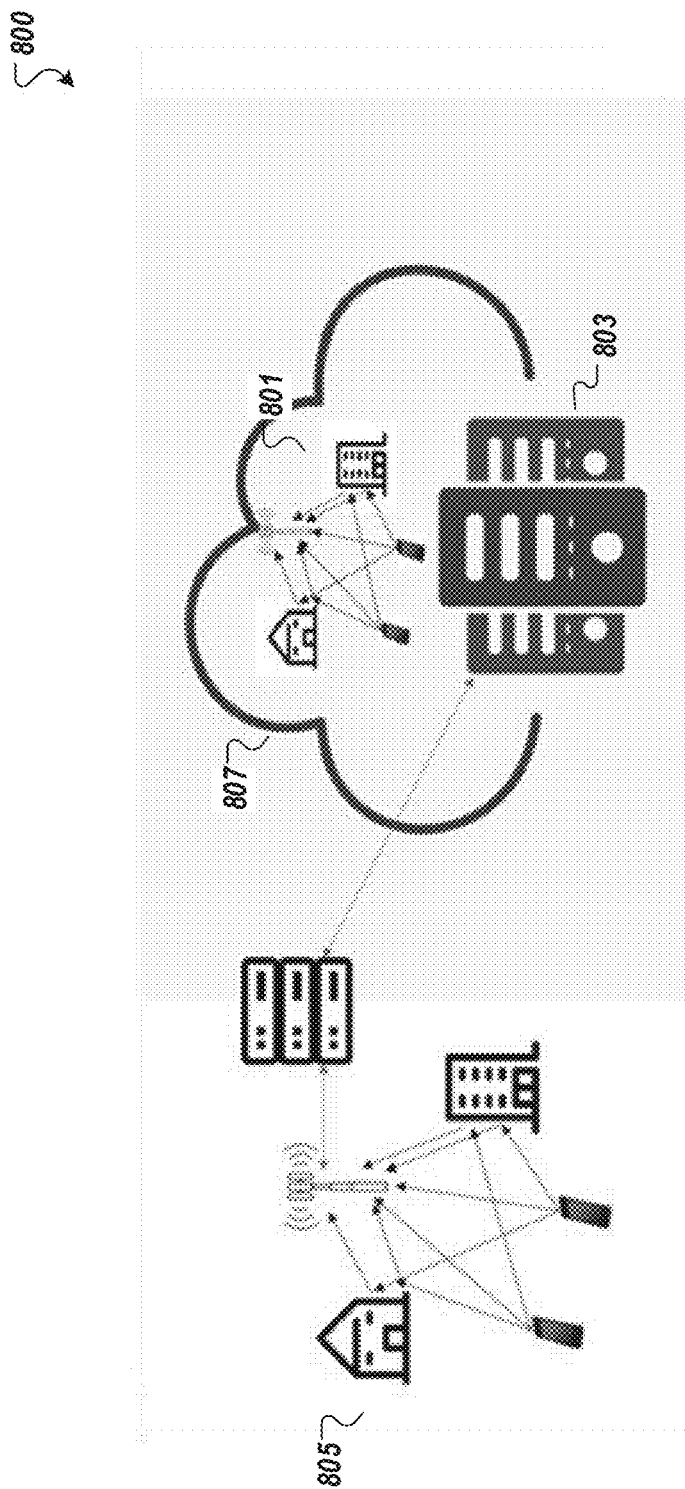
FIG. 8 is a diagram showing an example of system for simulating radio propagation.

FIG. 8 is a diagram showing an example of system 800 for simulating radio signal propagation. The system of FIG. 8 can simulate radio signal propagation by mirroring the real world using spatial and other inputs. The example system shows a simulation, which is represented as simulation 801, using a generative channel model network running in a compute device 803, such as a cloud server, a GPU device, a cluster of computers, edge-cloud or other compute platform.

The compute device 803 uses a generative network to update the network weights/parameters and/or to simulate radio propagation based on this model. The cloud or network compute resources simulate a mirror image of the physical world 805 within the digital world, simulating physical geometries, device and object behaviors, alongside wireless propagation phenomena. As shown, a generative channel model, for example, a VAE based model for the channel, can be stored or maintained in such a cloud digital-twin, and used to simulate expected channel propagation phenomena.

In this case, a real-world propagation environment in the physical world 805 can transmit measurements, channel response information or channel sounding data, channel quality information, or other such measurement-based statistics to the cloud 807 and corresponding compute device 803 to the simulated environment alongside telemetry, location information, or other historical contextual information. Simulations within the digital cloud wireless channel simulation environment, such as simulation 801 of the real world 805, can be used to predict propagation, bandwidth, latency, link-quality, or other properties about the wireless system by using a set of wireless channel models, especially generative data-driven channel models such as the Channel-GAN or the Channel-VAE.

Since propagation in many bands such as very high frequency (VHF), ultra high frequency (UHF), or extremely high frequency (EHF), can be challenging to predict, these data-driven models, sometimes in the form of a digital twin world representation, can be used to simulate physical paths and/or propagation effects relating to the physical world of these signals, placement of new objects or structures, movement of objects in the physical world, new types of antennas or placement of base stations or radio devices or other actions or phenomena to be simulated in the digital world for prediction of performance in the physical world.

In many cases, location measurements may be used as an input to the VAE, such as the VAE of FIG. 3, for example by including these in the latent space, within the latent representation of the channel. The latent space can include values sufficient to generate some or all possible channel responses in a given environment. Likewise, simulated latent locations can be used within the generative model to simulate performance of various wireless links or paths within a hypothetical or real wireless situation within the simulated system.

Figure 9:
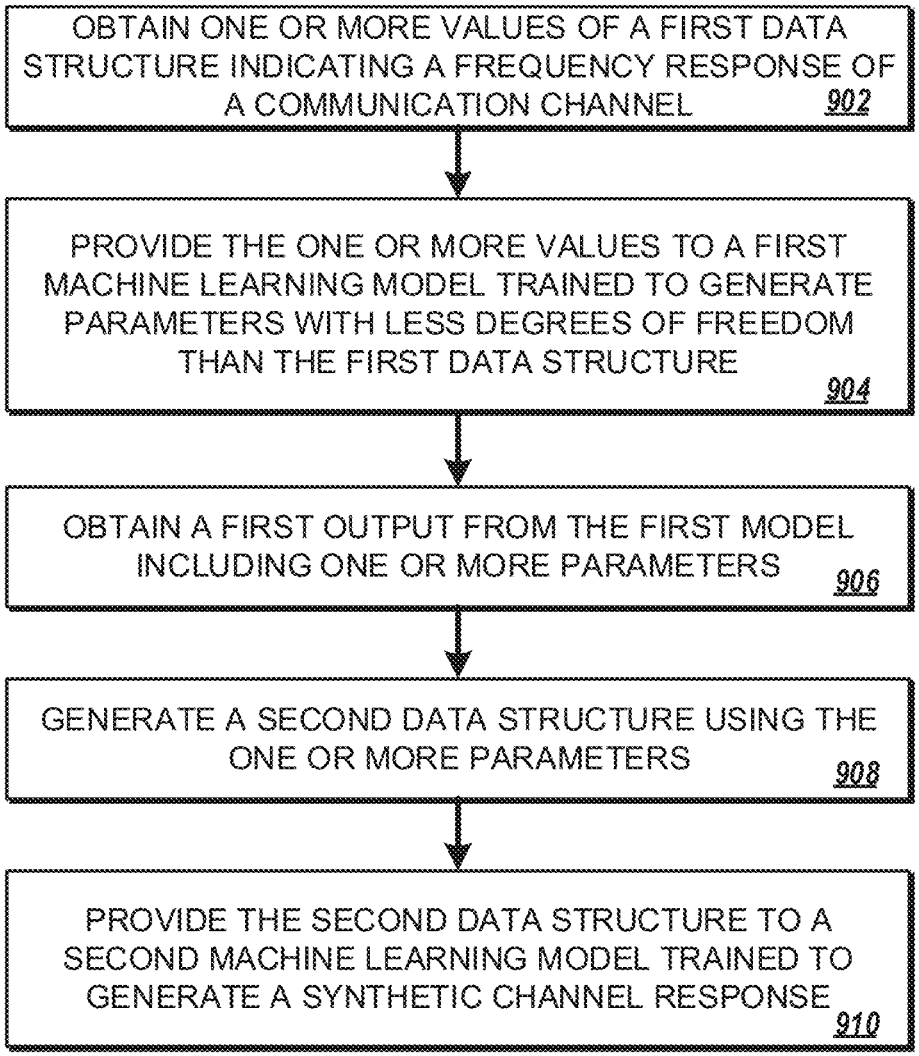
FIG. 9 is a flow diagram illustrating an example of a process for training a channel approximation system.

FIG. 9 is a flow diagram illustrating an example of a process 900 for training a channel approximation system. The process 900 may be performed by one or more electronic systems, for example, the device 115 of FIG. 1 or a device communicably connected to the device 115, e.g., a server.

The process 900 includes obtaining one or more values of a first data structure indicating a frequency response of a communication channel (902). For example, an operating device, such as the device 115 or a device communicably connected to the device 115 (e.g., a server), can obtain a channel response or transmitted data values. In FIG. 4, the device 115 obtains a channel response using the signal 108 and antenna 113. The channel response 303 is obtained by the channel response engine 403.

The process 900 includes providing the one or more values to a first machine learning model trained to generate parameters with less degrees of freedom than the first data structure (904). For example, an operating device, such as the device 115 or a device communicably connected to the device 115 (e.g., a server), can provide the input channel response 303 to the channel encoder network 301 of FIG. 3, as shown in image 307a. In some cases, the operating device can provide transmitted values, as shown in image 307b. In FIG. 4, the device 115 provides a channel response, e.g., the input channel response 303, from the stored channel responses 131, to the encoder network 301.

The process 900 includes obtaining a first output from the first model including one or more parameters (906). For example, an operating device, such as the device 115 or a device communicably connected to the device 115 (e.g., a server), can obtain distribution parameters 407. The distribution parameters 407 can specify a distribution of values from which the sampling module 409 samples. The sampling can be randomized within the distribution specified by the distribution parameters 407.

The process 900 includes generating a second data structure using the one or more parameters (908). For example, as shown in FIG. 4, the sampling module 409 samples from a distribution specified by the distribution parameters 407. The data values sampled from the distribution specified by the distribution parameters 407 are included in the learned latent space variable 205.

The process 900 includes providing the second data structure to a second machine learning model trained to generate a synthetic channel response (910). For example, an operating device, such as the device 115 or a device communicably connected to the device 115 (e.g., a server), can provide the learned latent space variable 205 to the decoder network 203.

Figure 10:
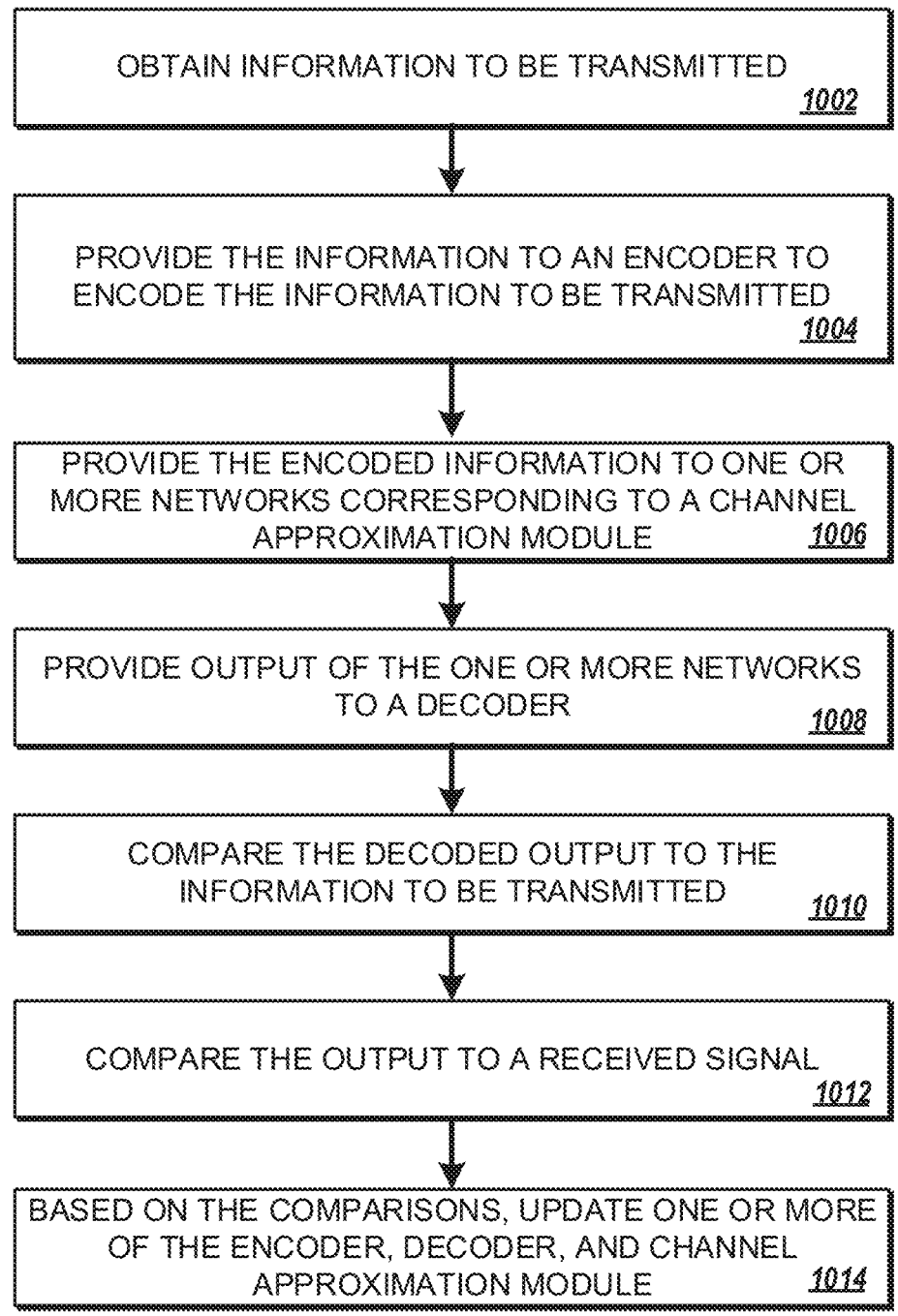
FIG. 10 is a flow diagram illustrating an example of a process for training a channel approximation system jointly with a signal encoder network and signal decoder network.

FIG. 10 is a flow diagram illustrating an example of a process for training a channel approximation system jointly with a signal encoder network and signal decoder network. The process 900 may be performed by one or more electronic systems, for example, the device 115 of FIG. 1 or a device communicably connected to the device 115, e.g., a server.

The process 1000 includes obtaining information to be transmitted (1002). For example, an operating device, such as the device 115 or a device communicably connected to the device 115 (e.g., a server), can obtain the transmitted information 121 from the signal 108 based on operations performed by the transmitted signal extraction module 119.

The process 1000 includes providing the information to an encoder to encode the information to be transmitted (1004). For example, an operating device, such as the device 115 or a device communicably connected to the device 115 (e.g., a server), can provide the transmitted information 121 to the encoder network 123.

The process 1000 includes providing the encoded information to one or more networks corresponding to a channel approximation module (1006). For example, an operating device, such as the device 115 or a device communicably connected to the device 115 (e.g., a server), can provide the encoded information 129 to the channel approximation module 133.

The process 1000 includes providing output of the one or more networks to a decoder (1008). For example, an operating device, such as the device 115 or a device communicably connected to the device 115 (e.g., a server), can provide the received signal approximation 135 to the decoder network 139.

The process 1000 includes comparing the decoded output to the information to be transmitted (1010). For example, the decoder and encoder update engine 143 can compare the transmitted information approximation 141 with the transmitted information 121.

The process 1000 includes comparing the output to a received signal (1012). For example, the channel update engine 137 can compare the received signal approximation 135 with the received signal 117.

The process 1000 includes based on the comparisons, updating one or more of the encoder, decoder, and channel approximation module (1014). For example, the decoder and encoder update engine 143, the channel update engine 137, and the combined update engine 147, can update one or more of the encoder network 123, decoder network 139, and the channel approximation module 133. Each of the encoder network 123, decoder network 139, and the channel approximation module 133 can include one or more neural networks. Updating the encoder network 123, decoder network 139, and the channel approximation module 133 can include adjusting one or more weights or layers of the corresponding neural networks.

Figure 11:
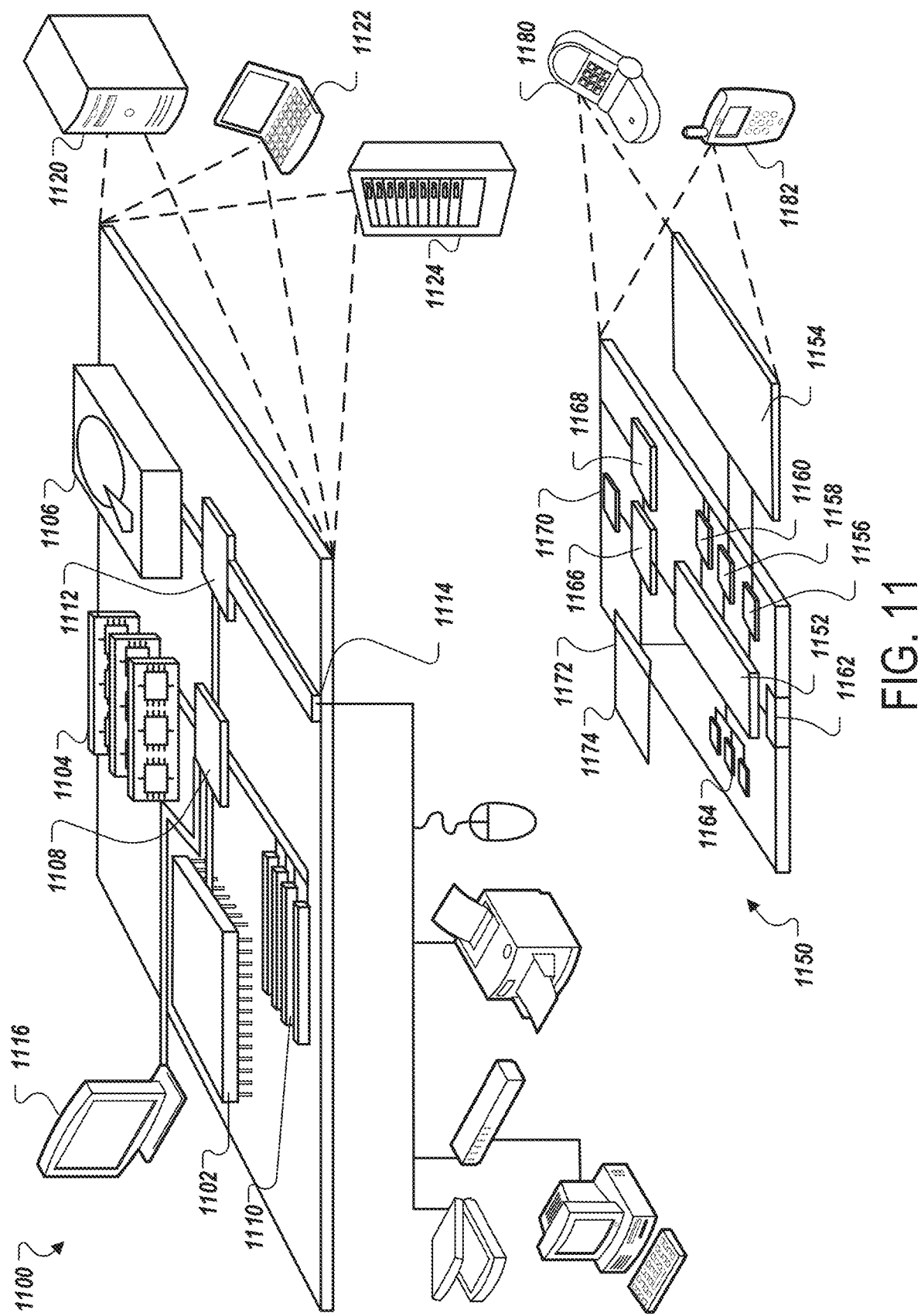
FIG. 11 is a diagram illustrating an example of a computing system used for training neural networks and generating variable communication channel responses.

FIG. 11 is a diagram illustrating an example of a computing system used for training neural networks and generating variable communication channel responses. The computing system includes computing device 1100 and a mobile computing device 1150, one or both of which can be used to implement the techniques described herein. For example, one or more components of the system 100 could be an example of the computing device 1100 or the mobile computing device 1150, such as the device 101; device 115, or a device communicably connected to the device 115, e.g., a server; device 501; or device 507.

The computing device 1100 represents various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1102 is a single threaded processor. In some implementations, the processor 1102 is a multi-threaded processor. In some implementations, the processor 1102 is a quantum computer.

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1102), perform one or more methods, such as those described above. The instructions can also be stored by one or more storage devices such as computer or machine-readable mediums (for example, the memory 1104, the storage device 1106, or memory on the processor 1102). The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device, such as a mobile computing device 1150. Each of such devices may include one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may include appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150 or may also store applications or other information for the mobile computing device 1150. Specifically, the expansion memory 1174 may include instructions to carry out or supplement the processes described above and may include secure information also. Thus, for example, the expansion memory 1174 may be provide as a security module for the mobile computing device 1150 and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (nonvolatile random-access memory), as discussed below. In some implementations, instructions are stored in an information carrier such that the instructions, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions can be received in a propagated signal, for example, over the transceiver 1168 or the external interface 1162.

The mobile computing device 1150 may communicate wirelessly through the communication interface 1166, which may include digital signal processing circuitry in some cases. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), 4G LTE/LTE-Advanced, 5G/5G Advanced, 6G cellular, among others. Such communication may occur, for example, through the transceiver 1168 using a radio frequency. In addition, short-range communication may occur, such as using a Bluetooth, Wi-Fi, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, among others) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
   obtaining one or more values indicating a channel response of a communication channel, wherein one or more values indicating the channel response is represented by a first data structure with N degrees of freedom;
   providing the one or more values to a first machine learning model trained to generate parameters for a second data structure that is represented with less than N degrees of freedom;
   obtaining a first output from the first machine learning model, the first output including one or more parameters;
   generating the second data structure using the one or more parameters; and
   providing the second data structure to a second machine learning model trained to generate a synthetic channel response that indicates power effects of a signal propagation within an environment.

2. The method of claim 1, wherein generating the second data structure using the one or more parameters comprises:
   determining a stochastic distribution using the one or more parameters; and
   obtaining a value of the second data structure using the stochastic distribution.

3. The method of claim 2, comprising:
   comparing the stochastic distribution with a training distribution for training the first machine learning model; and updating the first machine learning model based on comparing the stochastic distribution with the training distribution.

4. The method of claim 3, wherein the training distribution is one of a Gaussian distribution, tapped delay line (TDL), cluster delay line (CDL), Rician distribution, Rayleigh distribution, or results from a simulated ray-tracing model or other spatial simulation model.

5. The method of claim 2, wherein obtaining the first output including the one or more parameters comprises:
obtaining distribution parameters that specify a distribution of values from which a sampling module samples.

6. The method of claim 1, comprising:
comparing the synthetic channel response that indicates power effects of the signal propagation within the environment with one or more obtained channel responses; and
adjusting parameters of the second machine learning model based on comparing the synthetic channel response that indicates power effects of the signal propagation within the environment with the one or more obtained channel responses.

7. The method of claim 1, comprising:
sending first information through the communication channel;
obtaining, as an output of the communication channel, second information as a representation of the first information having been altered by transmission through the communication channel; and
generating the one or more values indicating the channel response based on comparing the first information to the second information.

8. The method of claim 7, wherein the communication channel includes at least one of an Additive White Gaussian Noise (AWGN) or Rayleigh fading channel model, International Telecommunication Union (ITU) or 3rd Generation Partnership Project (3GPP) fading channel model, emulated radio emissions, propagation models, ray tracing within simulated geometry or an environment to produce channel effects, TDL, CDL, a machine-learning network trained to approximate measurements over a real channel, channel state information estimation routine or other measurement signal processing algorithm, a combination of simulation and hardware transmission components, or a channel measurement within a wireless system.

9. The method of claim 1, comprising:
generating a received signal using the synthetic channel response that indicates power effects of the signal propagation within the environment and information corresponding to the received signal.

10. The method of claim 9, wherein generating the received signal comprises:
generating an output corresponding to a combination of the synthetic channel response that indicates power effects of the signal propagation within the environment and the information as the received signal.

11. The method of claim 10, wherein the combination includes a result of a multiplication between data represented by the synthetic channel response that indicates power effects of the signal propagation within the environment and data represented by the information.

12. The method of claim 10, wherein the combination includes a result of a convolution between data represented by the synthetic channel response that indicates power effects of the signal propagation within the environment and data represented by the information.

13. One or more non-transitory computer storage media encoded with computer program instructions that when executed by one or more computers cause the one or more computers to perform operations comprising:
obtaining one or more values indicating a channel response of a communication channel, wherein one or more values indicating the channel response is represented by a first data structure with N degrees of freedom;
providing the one or more values to a first machine learning model trained to generate parameters for a second data structure that is represented with less than N degrees of freedom;
obtaining a first output from the first machine learning model, the first output including one or more parameters;
generating the second data structure using the one or more parameters; and
providing the second data structure to a second machine learning model trained to generate a synthetic channel response that indicates power effects of a signal propagation within an environment.

14. The media of claim 13, wherein generating the second data structure using the one or more parameters comprises:
determining a stochastic distribution using the one or more parameters; and
obtaining a value of the second data structure using the stochastic distribution.

15. The media of claim 14, wherein the operations comprise:
comparing the stochastic distribution with a training distribution for training the first machine learning model; and
updating the first machine learning model based on comparing the stochastic distribution with the training distribution.

16. The media of claim 15, wherein the training distribution is one of a Gaussian distribution, tapped delay line (TDL), cluster delay line (CDL), Rician distribution, Rayleigh distribution, or results from a simulated ray-tracing model or other spatial simulation model.

17. The media of claim 13, wherein the operations comprise:
comparing the synthetic channel response that indicates power effects of the signal propagation within the environment with one or more obtained channel responses; and
adjusting parameters of the second machine learning model based on comparing the synthetic channel response that indicates power effects of the signal propagation within the environment with the one or more obtained channel responses.

18. The media of claim 13, wherein the operations comprise:
sending first information through the communication channel;
obtaining, as an output of the communication channel, second information as a representation of the first information having been altered by transmission through the communication channel; and
generating the one or more values indicating the channel response based on comparing the first information to the second information.

19. The media of claim 18, wherein the communication channel includes at least one of an Additive White Gaussian Noise (AWGN) or Rayleigh fading channel model, International Telecommunication Union (ITU) or 3rd Generation Partnership Project (3GPP) fading channel model, emulated radio emissions, propagation models, ray tracing within simulated geometry or an environment to produce channel effects, TDL, CDL, a machine-learning network trained to approximate measurements over a real channel, channel state information estimation routine or other measurement signal processing algorithm, a combination of simulation and hardware transmission components, or a channel measurement within a wireless system.

20. A system comprising:
- one or more computers and one or more storage devices on which are stored instructions that are operable, when executed by the one or more computers, to cause the one or more computers to perform operations comprising:
- obtaining one or more values indicating a channel response of a communication channel, wherein one or more values indicating the channel response is represented by a first data structure with N degrees of freedom;
- providing the one or more values to a first machine learning model trained to generate parameters for a second data structure that is represented with less than N degrees of freedom;
- obtaining a first output from the first machine learning model, the first output including one or more parameters;
- generating the second data structure using the one or more parameters; and
- providing the second data structure to a second machine learning model trained to generate a synthetic channel response that indicates power effects of a signal propagation within an environment.

* * * * *

UNITED STATES PATENT AND TRADEMARK OFFICE
CERTIFICATE OF CORRECTION

PATENT NO. : 12,493,790 B2  
APPLICATION NO. : 17/827250  
DATED : December 9, 2025  
INVENTOR(S) : Nitin Nair et al.

Page 1 of 1

It is certified that error appears in the above-identified patent and that said Letters Patent is hereby corrected as shown below:

On the Title Page

Column 1 (inventors), Item (72), Delete "Raj," and insert -- Rajib, --, therefor.

Signed and Sealed this  
Tenth Day of February, 2026

John A. Squires  
*Director of the United States Patent and Trademark Office*